Sept. 4, 1951     W. A. HUBER ET AL     2,566,332
PLAN POSITION INDICATING SYSTEM
Filed Jan. 20, 1944     6 Sheets-Sheet 1
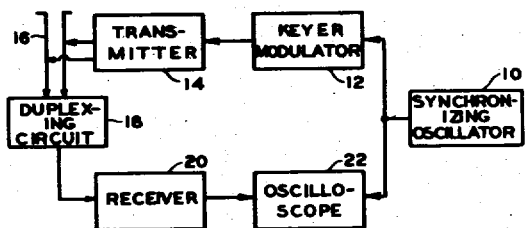
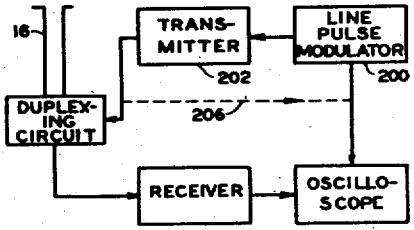
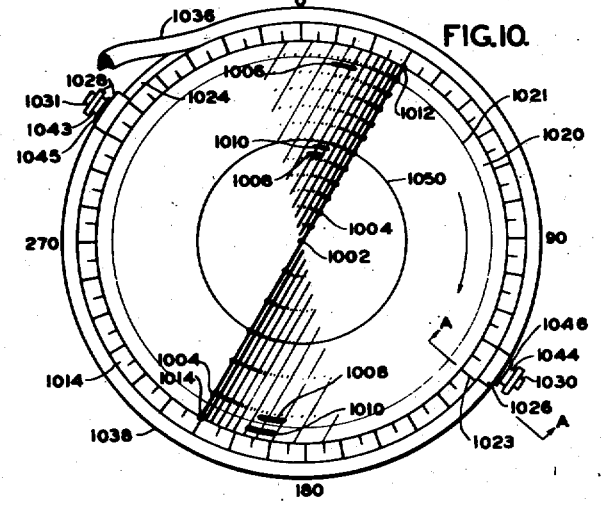
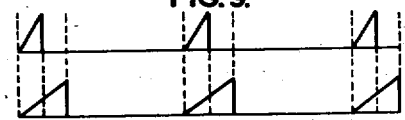
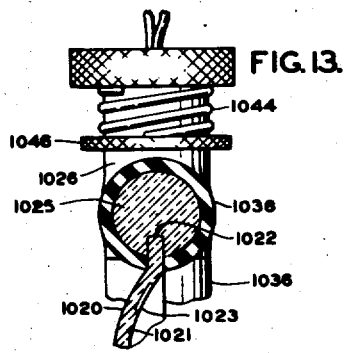
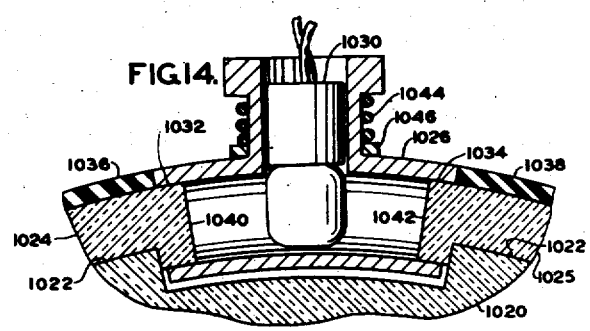
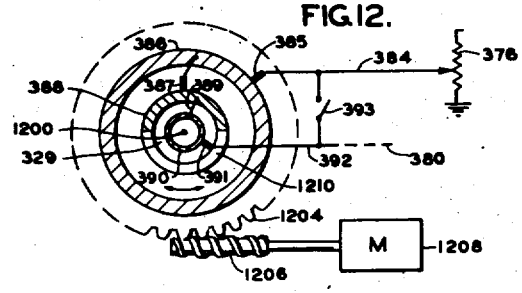
*INVENTOR.*
WILLIAM A. HUBER
MAX GINDOFF
BY *William D Hall*
*Attorney*

Sept. 4, 1951 W. A. HUBER ET AL 2,566,332
PLAN POSITION INDICATING SYSTEM
Filed Jan. 20, 1944 6 Sheets-Sheet 2

INVENTOR.
WILLIAM A. HUBER
MAX GINDOFF
BY William D. Hall
Attorney

INVENTOR.
WILLIAM A. HUBER
MAX GINDOFF

INVENTOR.
WILLIAM A. HUBER
MAX GINDOFF

Patented Sept. 4, 1951

2,566,332

UNITED STATES PATENT OFFICE 2,566,332

PLAN POSITION INDICATING SYSTEM

William A. Huber, Neptune City, and
Max Gindoff, Lakewood, N. J.

Application January 20, 1944, Serial No. 518,934
27 Claims. (Cl. 343—11)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to radio object-locating systems and more particularly to radio locators utilizing a plan position indicator for furnishing the desired information concerning the location of targets.

Plan position indicators relate to that type of indicators which present a polar coordinate map in terms of range and bearing of all objects "visible" to the radar system. This type of indication may be produced by means of a polarized transmitting-receiving antenna array rotated around its vertical axis, and a receiver connected to a cathode ray oscilloscope with a radial sweep synchronously following the rotating antenna. The rotating radial sweep makes an electron beam sweep from the center of a long persistence fluorescent screen of the cathode-ray tube to its outer edge by starting the radial sweep at the instant of transmitting a radio frequency pulse, the radial distance on the screen of the cathode-ray tube is made to represent the range of an object while an angle formed between a reference line and a radial trace through the center of an echo image is made to represent the bearing of an object, or its azimuth, by rotating the radial sweep about the longitudinal axis of the tube in synchronism and in phase with the rotation of the antenna so that the radial sweep and the axis of the antenna lobe always point in exactly the same direction. When a radio frequency pulse from the transmitter strikes an object, some small portion of energy will be re-radiated in the direction of the radio locator receiver, and if the reflected pulse is sufficiently strong, a distinguishable signal or echo is registered by the receiver. These signals are applied to an intensity grid or a cathode of the cathode-ray tube to produce brightening of the cathode-ray trace for each echo received. This is the so-called intensity modulation, and it results in the echoes appearing as bright circular arcs on the fluorescent screen of the oscilloscope. A target appears as a small arc due to the width of the antenna beam. The radial distance and the angular position of the center of such an arc give respectively the range and the azimuth of the target producing this arc. For obtaining bearing readings, a scale in degrees is usually provided around the periphery of the cathode-ray tube screen with a 0° line pointing to the north, as illustrated in Fig. 10. Some form of range scale is also provided for determining the range of a target; in some instances this scale consists of concentric circles engraved on a transparent grating superimposed over the screen of the tube, and in other instances it consists of "marker" signals which intensity modulates the cathode-ray beam so that they appear as bright circles on the oscilloscope screen.

The name originally given to this apparatus was "Radial Sweep Systems" since it is descriptive of the method used for producing the required result. After some time, "Plan Position Indicator," abbreviated as P. P. I. was adapted as more suggestive of the results accomplished by such systems. Accordingly, henceforth, the apparatus will be simply referred to as P. P. I. in this specification.

The P. P. I. has the inherent advantage of presenting on the screen of a cathode-ray tube the true bearing and range of all targets in the plane in which the antenna is rotating. This is illustrated in Fig. 8 which shows a target 800 as it appears on the screen of a P. P. I. oscilloscope 802. This indication is accomplished in the following manner: when the exploratory pulse leaves the antenna, the beam of the cathode-ray tube leaves the geometric center of the screen traveling in the same direction as the radiated pulse. Sometime later the echo reaches the receiver and at this instant the output of the receiver intensifies the cathode-ray beam which in turn produces a luminous spot on the screen of the cathode-ray tube; thus, the distance of the spot from the center is proportional to range. To obtain azimuth scanning, the antenna is rotated at a uniform angular velocity, and the sweep is made to follow the antenna so that the radial path of the cathode-ray beam and the axis of the antenna lobe continuously point in the same direction; thus the angular position of the spot on the oscilloscope screen represents the true bearing of the object. After completion of the sweep, the cathode-ray beam returns to the center of the tube and waits for the next exploratory pulse to leave the antenna.

Thus, there are two fundamental requirements which must be complied with when this type of indicator is used: the sweep must start from the center on its outward radial journey simultaneously with the radiation of the exploratory pulse, and the sweep path must have the direction corresponding to the direction of the radiation. From this it follows that the point at which the electron beam strikes the fluorescent screen is determined by the polar coordinates which are $r$ for range, and angle $\theta$ for bearing, as illustrated in Fig. 8. For the sweep to be linear, the electron beam must move radially at uniform velocity so that equal segments of the radial trace could represent equal increments of range.

The maximum range reached by the electron beam depends upon the length of time consumed by the sweep for the completion of its radial journey; therefore, different maximum ranges may be obtained by merely changing this time, which is accomplished by changing the slope of the linear portion of the sweep, as illustrated in Fig. 9. This figure illustrates two series of voltage waves, series A being for short range and series B for long range. In Fig. 9, the series A waves reach their maximum amplitude in half of the time required for the series B. Since the range determination depends on the constant velocity of propagation of electromagnetic waves, it is obvious that the maximum range of the series A is equal to half of the maximum range of the series B. Thus, plan position indicators may have several ranges available for use, but it must be remembered that, unless one range is a multiple of the other, each change of range necessitates a change of range scale on the grating of the tube.

From the description of the P. P. I. systems given thus far, it follows that the effect of a map is produced on the screen of the P. P. I. oscilloscope, and it is a known expedient in the art to superimpose over the screen of the P. P. I. oscilloscope a grid, or a grating, of polar coordinates together with a transparent map of the locality that is being scanned. The map and the grating are ordinarily so oriented that the north-south line coincides with the 0–180° azimuth line of the superimposed grating, with the viewer's position at the center of the screen.

The amount of radar information that can be obtained from a P. P. I. oscilloscope screen is limited by the use made of the effective area of the cathode-ray screen. As mentioned previously, the conventional P. P. I. oscilloscope utilizes a sweep which starts at the geometric center of the cathode-ray screen and sweeps linearly with time toward its periphery. The direction the sweep takes when it leaves the center of the screen is controllable and can be in any direction, but in actual operation, in order to obtain true azimuth determinations, the sweep rotates through 360° around the center of the screen in phase and in synchronism with the antenna array; accordingly, as a rule, the entire area of the cathode-ray screen is scanned. Because of this rotational sweep through 360°, one may be inclined to think that there is no room left on the P. P. I. screen for any additional indications. This is not necessarily the case in every instance for two reasons. The first reason relates to the rotational speed of the sweep. As mentioned previously, this speed must be equal to the speed of rotation of the antenna array of the radio locator for obtaining true azimuth readings. The antenna array rotational speeds are ordinarily quite low so that by far the larger portion of the oscilloscope screen appears in its normal, blank state because of the limited retentivity of the screen. Frequently P. P. I. oscilloscopes are used in connection with radar systems the antenna mounts of which are not capable of the rotational speeds greater than one revolution per minute. When this is the case, the retentivity of the display screen is not long enough for retention of echo images from one revolution of the cathode-ray beam to the other so that there are times when a large sector of the display screen is unexcited, and, therefore, appears in its normal neutral state. This large unexcited sector may be utilized for producing some auxiliary images, if such images can improve the performance of a P. P. I. system. The second reason why some additional indications may be produced on a P. P. I. oscilloscope screen relates to the fact that there are many applications of P. P. I. systems which do not require 360° azimuth scanning, and where only sector scanning, such as a 180° sector, is all that is required. In the latter case, one half of the screen becomes permanently available for the reproduction of any additional auxiliary signals.

The invention discloses apparatus and methods for utilizing these unexcited sectors on the oscilloscope display screen for providing additional indications and additional radar information which enhances the performance of the entire P. P. I. system by increasing its accuracy and its versatility.

In order to accomplish this result, the invention provides two sweep circuits for a P. P. I. oscilloscope which make the cathode-ray beam travel alternately first along one radius, and then along the other radius which is diametrically opposite the first radius; accordingly, two sweep patterns substantially 180° out of space phase appear on the screen of the oscilloscope tube. Because of this result, this type of sweep will be referred to in this specification as a "bi-radial sweep." The bi-radial sweep, like the single radial sweep used for producing the conventional P. P. I. display, originates at the geometric center of the cathode-ray screen at the instant of transmitting an exploratory pulse, and proceeds radially toward tube's periphery. However, the sweeps forming the bi-radial display are 180° out of space phase, and there is one bi-radial sweep for two transmitted exploratory pulses, one exploratory pulse starting one sweep, and the next pulse starting the other sweep. This bi-radial sweep makes it possible to display additional indications on the screen of a P. P. I. oscilloscope in such a manner that, while one type of information appears on one sector of the screen, the additional information appears on the diametrically opposite sector of the same screen. Because of such disposition of the two sweeps it becomes possible to utilize two sectors of the oscilloscope screen without producing any image interference of any kind between the two displays.

This type of display widens the possibilities of P. P. I. systems since it enables one to display on the same screen simultaneously two ranges. Depending upon the adjustment of special oscilloscope circuits, which will be disclosed later on in this specification, it now becomes possible to make both ranges start at zero range, or delay one or both ranges on the oscilloscope screen any desired amount. It thus becomes possible to use one of the radial sweeps as a vernier for the other, reproducing any section of the main range on an expanded scale enabling one to separate the target indications which appear merged on the main range sweep. Moreover, such sweep arrangement enables one to determine the target range as well as its azimuth more quickly and with a higher degree of precision than with the known P. P. I. systems.

It is, therefore, the principal object of this invention to provide a new method and apparatus for a more effective utilization of an oscilloscope screen in P. P. I. radio object-locating systems.

Another object of our invention is to provide a P. P. I. system with a bi-radial sweep oscilloscope which enables one to display simultaneously two ranges on the screen of a single P. P. I. oscilloscope tube. These ranges may remain permanently fixed or one of them may remain permanently fixed while the occurrence of the other sweep, and range, may be varied so as to act as a vernier for the range that remains fixed.

Still another object of this invention is to provide a bi-radial sweep for a P. P. I. which can be operated either in connection with synchronous radio locators, which are under constant control of a synchronizing oscillator, or in connection with self-synchronous radio locators, which are controlled either by a line pulse modulator or the transmitted signal.

Still another object of this invention is to provide switching arrangements which enable one to use either of the two sweeps separately, to scan only the desired sector at normal angular velocity and at the same time gradually rotate this sector for obtaining 360° azimuth scanning at a reduced angular velocity.

Still another object of this invention is to provide grating which can be well illuminated, and which, when superimposed over the screen of an oscilloscope tube, would not obliterate the images produced on the fluorescent screen of the oscilloscope tube by its high degree of illumination.

Still an additional object of this invention is to provide circuits which enable one in a P. P. I. system to superimpose the range scale directly on the cathode-ray beam by intensity modulating this beam at controllable intervals so that the range scale appears directly on the screen of an oscilloscope as a series of bright dots.

The novel features which we believe to be characteristic of our invention are set forth with particularity in the appended claims. Our invention itself, however, both as to its organization and method of operation, together with the further objects and advantages thereof, may best be understood by reference to the following description in connection with the accompanying drawings in which:

Figure 1 is a block diagram of a synchronous radio locator;

Figure 2 is a block diagram of a self-synchronous radio locator;

Figure 3:
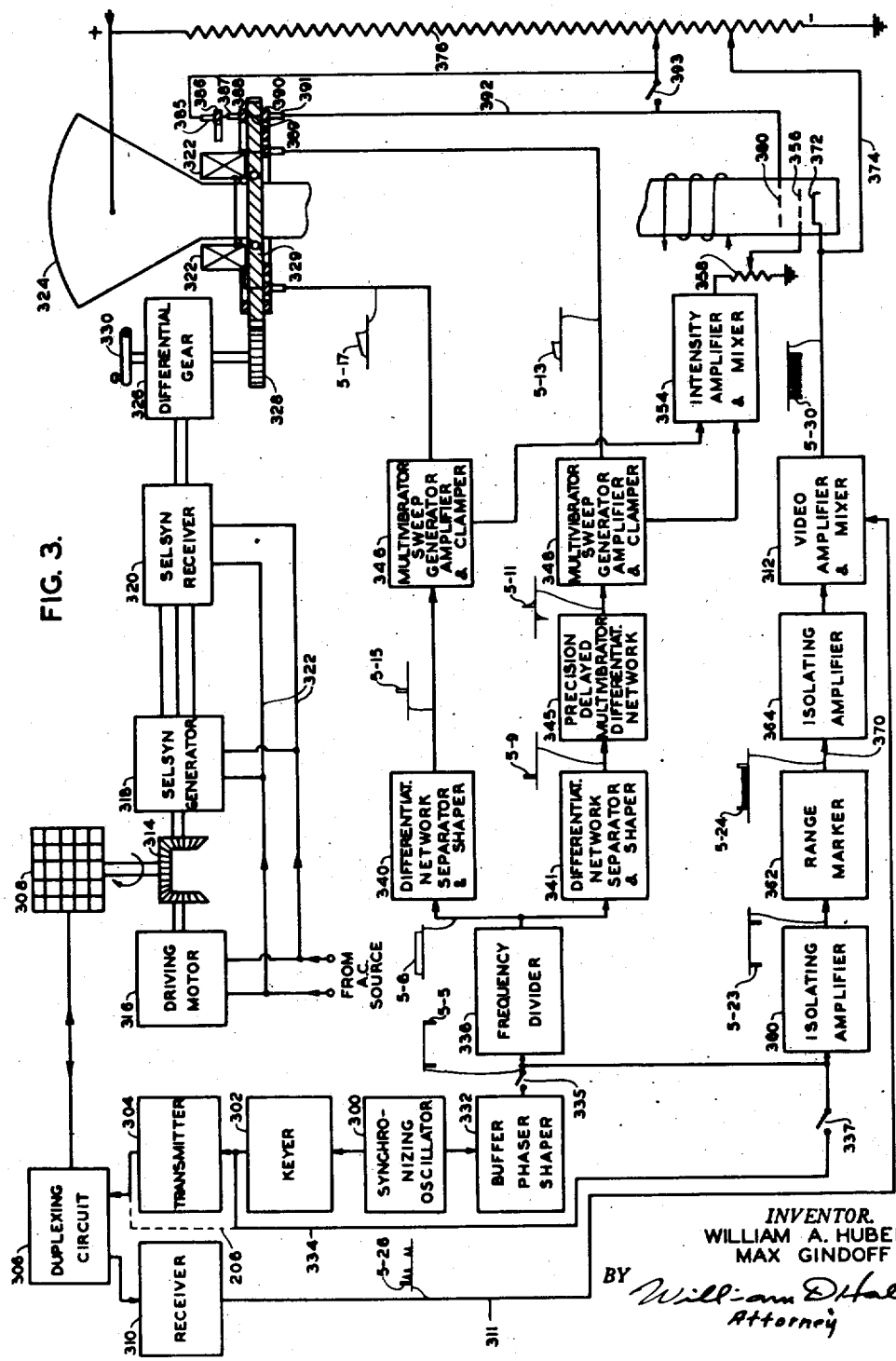
Figure 4:
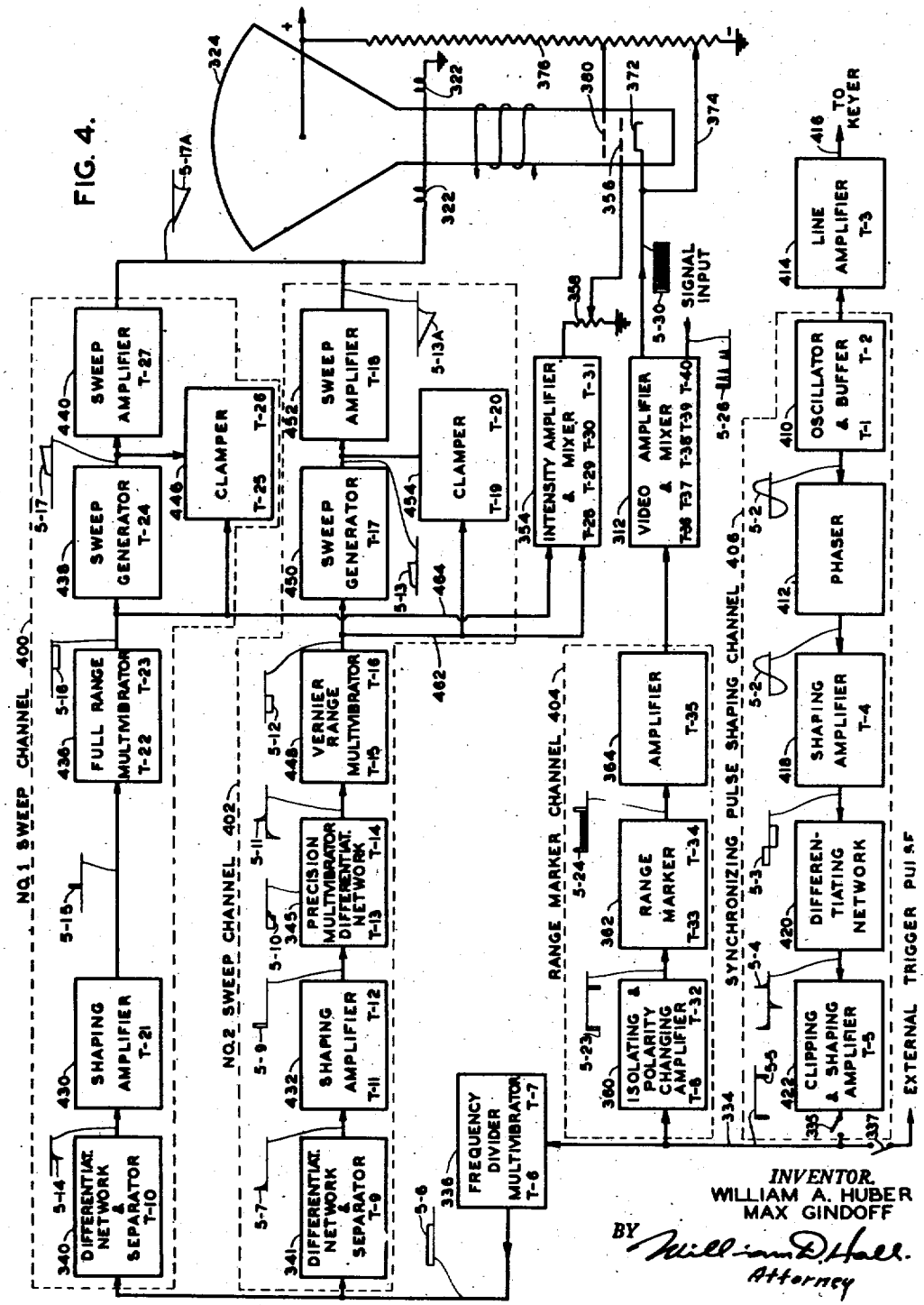
Figure 5:
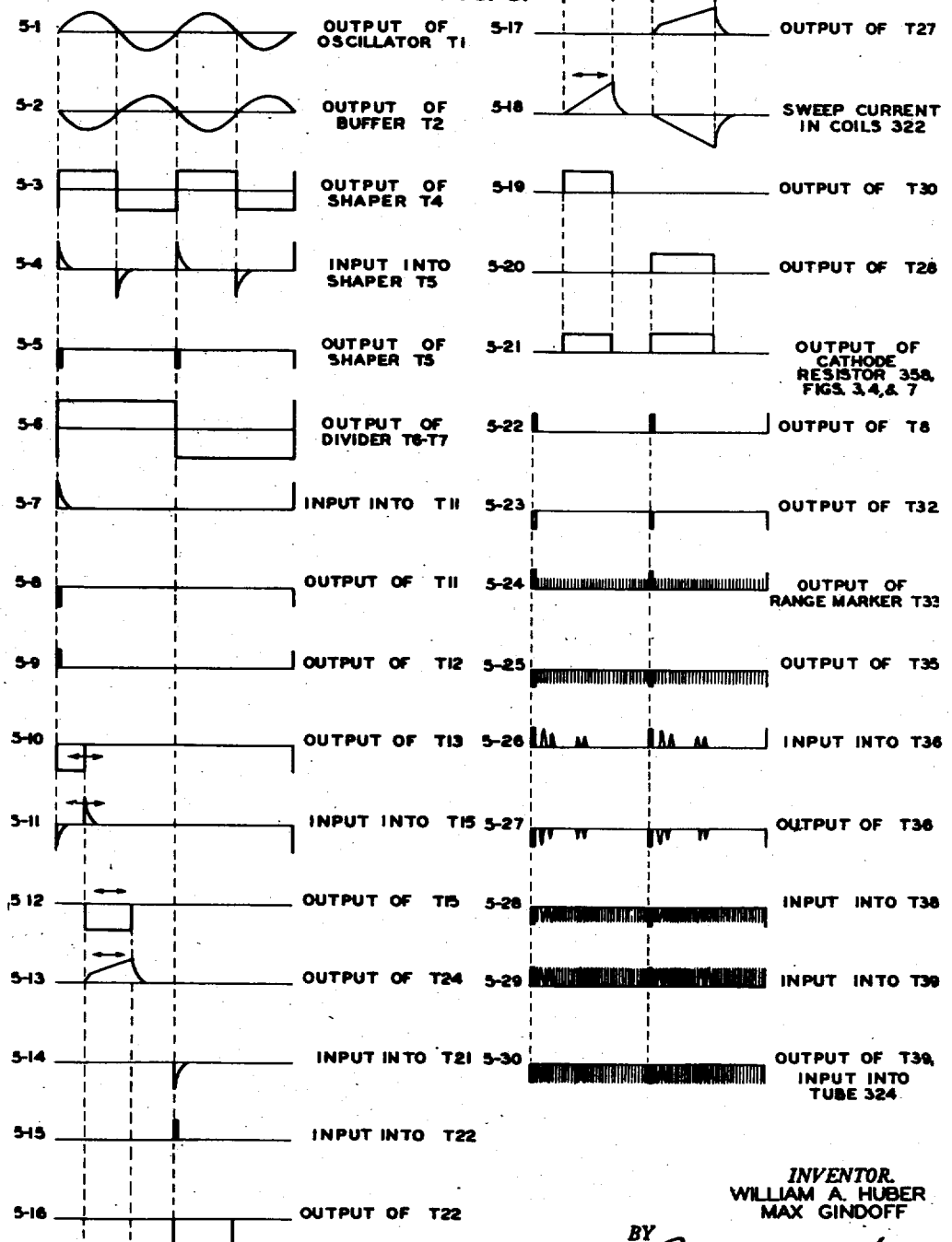
Figure 6:
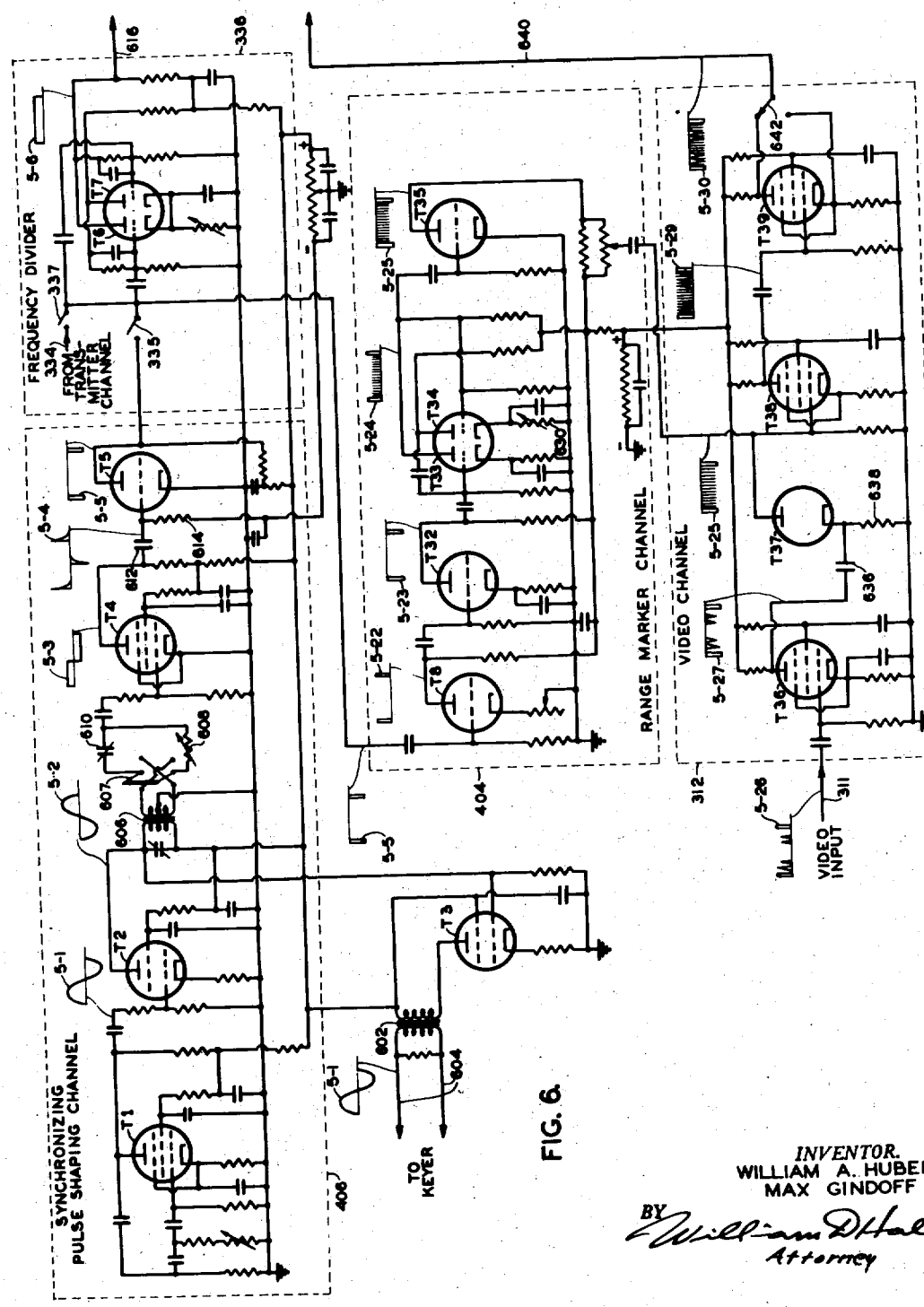
Figure 7:
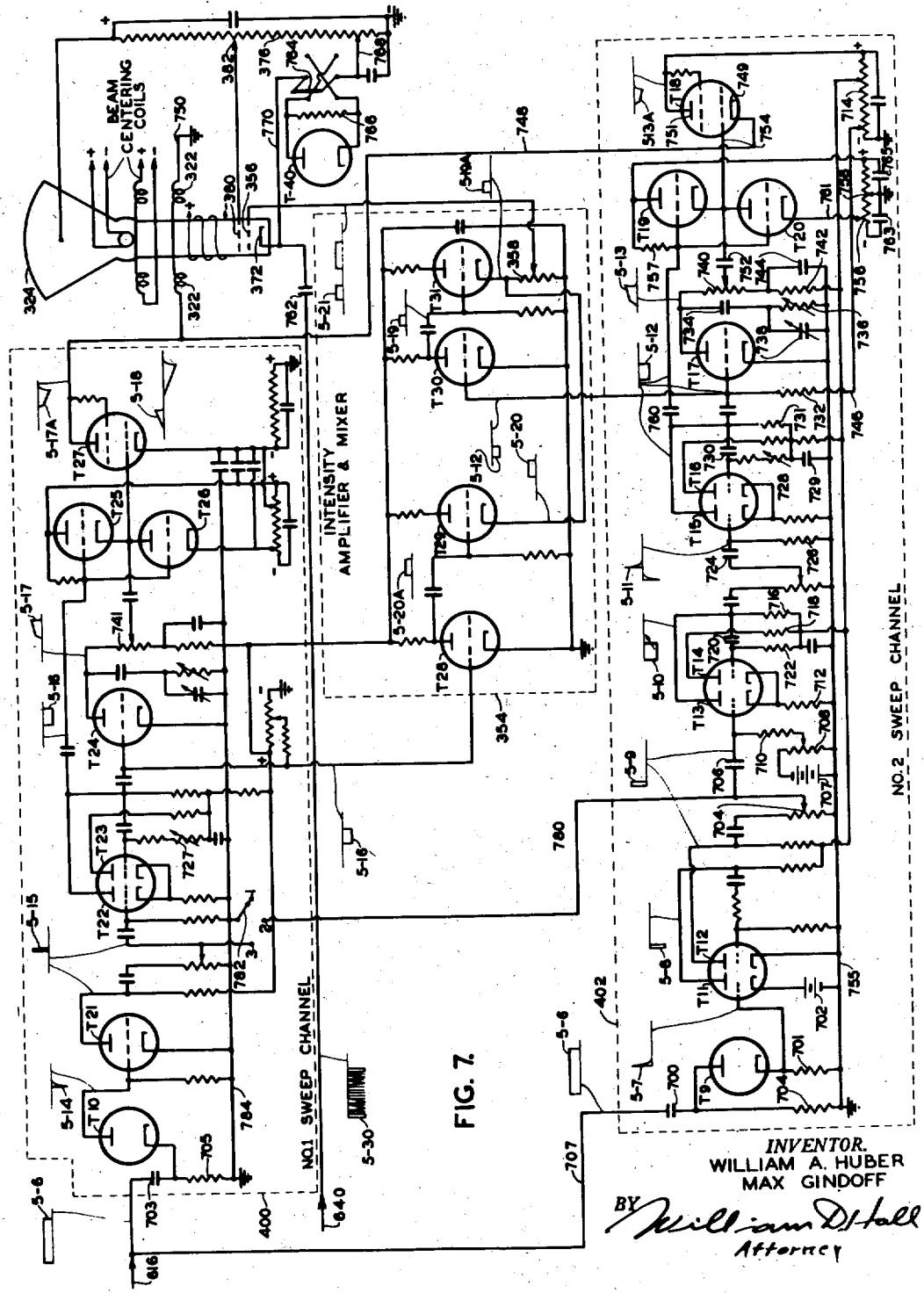

Figure 3 is a block diagram of the bi-radial P. P. I. system;

Figure 4 is a block diagram of the bi-radial oscilloscope circuit;

Figure 5 illustrates the oscillograms of the waves produced by the various components of the bi-radial P. P. I. oscilloscope;

Figures 6 and 7 are the schematic diagrams of the bi-radial P. P. I. oscilloscope;

Figures 8 and 9 are explanatory figures which are used to aid the understanding of the invention;

Figure 10 illustrates a bi-radial sweep reproduced on a screen of an oscilloscope tube and an azimuth grating surrounding the screen;

Figure 11 illustrates the relationship between Figures 6 and 7;

Figure 12 is a schematic diagram of a commutator for sector scanning; and

Figures 13 and 14 are detail cross-sectional views of the oscilloscope grating illustrated in Figure 10.

*Classification of the radio object-locating system*

Before proceeding with the description of the specific systems and circuits disclosed in this specification, for the sake of clarity of the disclosure, a broad present day classification of the radio object-locating systems will be given first. The two broad classes of the radio locators are as follows: one class uses a synchronizing oscillator for controlling operating periods of transmitting and receiving channels, this oscillator keeping the two channels constantly in the strictest synchronism. This type of system is sometimes called a synchronous system. In the second class of systems the synchronizing oscillator may be absent altogether, and the synchronous operation of the transmitting and receiving channels is accomplished by using either a keying or a transmitting pulse. The latter class of systems is called the self-synchronous systems. They ordinarily use the "slave sweep" or "servo sweep" circuits, and spark gap keyers; when spark gap keyers are combined with Marx circuit and Guilleman line, the spark gap keyers are then called line pulse modulators.

The invention relates to both classes of the radio object-locating systems. Figure 1 is a block diagram of the radio object-locating system of the first class, i. e. the synchronous system, while Fig. 2 discloses a block diagram of a system of the second class, i. e. the self-synchronous system.

Referring to Fig. 1, a synchronizing oscillator 10, the frequency of which is adjusted so as to conform with the desired range of the system, generates a sinusoidal wave which is impressed on a keyer modulator 12 comprising a series of shaping and power amplifiers which transform the sinusoidal wave into a series of powerful voltage pulses of very short duration occurring once for each cycle of the sinusoidal wave. The duration of these pulses is ordinarily of the order of one to three micro-seconds. These are impressed on a transmitter 14 which is set into ultra high frequency oscillations for the duration of the keying pulse. The U. H. F. pulse is impressed on a highly directional antenna array 16 either directly or through a duplexing circuit 18, the antenna array transmitting one exploratory pulse for each cycle generated by the synchronizing oscillator 10. It is quite customary in connection with the P. P. I. systems that the antenna arrays should scan the entire area by continuously revolving in one direction through 360°. However, sector scanning, such as 180° sector, is also possible and will be described more fully, together with its advantages, later in this specification. If there are any objects within the scanned field of antenna 16 which are capable of reradiating the transmitted pulse, a small portion of the transmitted energy will be reradiated by these objects in the direction of the radio locator and will reach antenna array 16, which at this instant acts as a receiving antenna. The received energy is impressed on a duplexing circuit 18 and a receiver 20, the output of which is impressed on a P. P. I. oscilloscope 22, the latter being also connected to the synchronizing oscillator 10.

For more detailed descriptions of suitable types of transmitter 14 and keyer 12, reference is made to applications of James R. Moore, Serial Nos. 467,268 and 467,269 both filed on November 28, 1942, Patent No. 2,464,252, granted March 15, 1949, and Patent No. 2,462,885, granted March 1, 1949, respectively; John W. Marchetti, Serial No. 477,782, filed March 3, 1943, and Melvin D. Baller, Serial No. 477,103, filed February 25, 1943, Patent No. 2,497,854 granted February 21, 1950. For a more detailed description of suitable types of duplexing circuits, reference is made to an application of L. C. Young and R. M. Page entitled "Impedance Control Coupling and Decoupling System," Serial No. 326,640, filed on March 29, 1940, and an application of A. A. Varela and R. A. Herring, Jr., entitled "Antenna Duplexing System," Serial No. 452,534, filed on July 27, 1942. Receiver 20 circuits are well known in the art, and need no detailed description or reference. Any U. H. F. heterodyne receiver is suitable for the purpose at hand. The oscilloscope 22 circuits will be described in great detail in this specification.

The operation of the system is briefly as follows: synchronizing oscillator 10 controls keyer modulator 12 in such a manner that the latter keys transmitter 14 with a constant predetermined periodicity, this periodicity being controlled by the frequency of the oscillator. Transmitter 14 emits through the polarized directional antenna array 16 periodic pulses which constitute the field exploring signals. If there is a plurality of echo-producing objects within the antenna field, their echoes will appear as a plurality of bright arcs on the screen of the P. P. I. oscilloscope, as illustrated at 800, 1008 and 1010 in Figs. 8 and 10 respectively. The azimuth of the object is determined by reference to the angular position of a line bisecting the image arc on the P. P. I. oscilloscope (angle $\theta$, Fig. 8), while its range is determined by reference to the linear scale and its distance from the center of the oscilloscope screen (distance $r$, Fig. 8).

Figure 2 illustrates a simplified block diagram of a self-synchronous P. P. I. radio locator. In this system synchronization of the receiving and transmitting channels is obtained by using the voltage pulse generated by the keyer or the transmitter in the receiving channel. The keying pulse is generated by a line pulse modulator 200 which may have different degrees of stability depending upon the type of line switch used. The most important advantages of the line pulse modulator and of the self-synchronous systems as compared to the synchronous system, where modulation is obtained from a master oscillator, resides in the facts that the line pulse modulator represents a much lighter equipment, it is possible to radiate pulses of extremely short duration and greater power by means of the line pulse modulator, and the rate of keying of the transmitter may be very readily changed, which, together with some additional changes in the system, results in change of range of the radio locator. In the line pulse modulated systems, the interval between the pulses is fairly long as compared to the duration of the pulses, and both the repetition rate and pulse duration vary considerably from one radar application to another.

In the radio object-locators, the pulse duration is usually of the order of one to two microseconds, and the repetition rate varies from 60 to 2500 pulses per second. In principle, the line pulse modulation method consists in switching "on" and "off" the high tension supply to the oscillator so that the valve is "on" for the duration of the pulses and "off" in the interval between the pulses. On account of the short duration of the pulse, a relatively high repetition rate, and high peak power in the pulses, special switching and timing methods are used, which consist of periodic charging and discharging of artificial lines.

In describing the synchronous system disclosed in Fig. 1, it has been stated that synchronization of the entire system depends on the synchronizing oscillator. Since there is no synchronizing oscillator in Fig. 2, the entire system in this case is synchronized by means of the voltage generated by the line pulse modulator 200 or the signal generated by the transmitter 202. The alternate connection is illustrated by a dotted line 206. Except for the difference in keying of the transmitter and synchronizing of the transmitting and receiving channels, the operation of the self-synchronous system is otherwise identical with the operation of the synchronous system disclosed in connection to Fig. 1. Therefore, Figs. 8 and 10 illustrating the oscilloscope screen and the echo images also apply to Fig. 2.

The term echo as used in this specification is not to be restricted to signals which are reflected or reradiated by any object. This term is also used to signify any response to a signal such as the one obtained by means of a normally inoperative transmitter located on an object which when keyed by the transmitted pulse automatically sends an answering pulse either on the same or different frequency.

Referring now to Fig. 3, which is a simplified block diagram of a P. P. I. system with the biradial sweep P. P. I oscilloscope, a synchronizing oscillator 300 appears in the central left portion of the block diagram, and the transmitter channel components consisting of a keyer 302 and a transmitter 304 are connected to the synchronizing oscillator 300, and appear directly above the oscillator. The output of transmitter 304 is impressed through a duplexing circuit 306 on a polarized antenna array 308. The same antenna array is also connected through duplexing circuit 316 to a receiver 310, the output of the latter being impressed on a video amplifier and mixer 312, the purpose of which will be described later in this specification. Antenna array 308 is connected through gears 314 on one side to a driving motor 316 and on the other side to a selsyn generator 318, the three-phase stator winding of the latter being connected to a receiver selsyn 320. Driving motor 316, as well as the generator and receiver selsyns 318 and 320 are connected to a common source of alternating current over conductors 322. Driving motor 316 rotates the antenna array 308 at a constant predetermined speed, and the selsyn generator and receiver 318—320 are used for transmitting the rotational movement of the antenna array to a rotating electromagnetic deflection coil 322 used for producing rotation and radial sweep of the cathode-ray beam in a P. P. I. oscilloscope tube 324. This electromechanical connection between the rotating shaft of antenna array 308 and rotating coil 322, which also includes a differential gear 326 and driving gears 328 and 329, acts as an interlocking means between the antenna and the cathode-ray beam of the oscilloscope tube 324 so that the cathode-ray beam always follows and always points in the same direction as antenna 308. In order to point initially the radial beam deflection of the oscilloscope tube and the axis of the antenna lobe in the same direction, differential gear 326 is provided with an indexing wheel 330 which is used for adjusting the angular position of coil 322 and the beam deflection to that of the axis of the antenna lobe.

Synchronizing oscillator 300 is also connected to a buffer, phaser and shaper 332 which transforms the sinusoidal wave generated by the synchronizing oscillator 300 into a series of substantially rectangular pulses 5—5 of short duration. It should be mentioned here that the oscillograms in Figs. 3, 4, 6 and 7 bear the same numerals as the corresponding oscillograms in Fig. 5. The rectangular pulses 5—5 are impressed on a frequency divider 338 consisting of an Eccles-Jordan multivibrator circuit, which generates a series of rectangular waves 5—6. These are impressed in parallel on two differentiating networks, separators and shapers 340 and 341 which transform the rectangular waves impressed upon them into two series of rectangular pulses 5—15 and 5—9. Pulse 5—15 is used for controlling a multivibrator 346 and saw-tooth oscillator, amplifier and clamper connected to it, while pulse 5—9 controls a precision delayed multivibrator and differential network 345 and circuits included in a block 348. Two saw-tooth waves 5—17 and 5—13 appearing in the output of the blocks 346 and 348, are impressed on a rotating yoke, consisting of electromagnetic deflection coils 322, where they produce the radial deflection of the cathode-ray beam from the center of the cathode-ray screen alternately in the opposite directions. The precision delayed multivibrator circuit 345 is inserted in the lower sweep generating channel for delaying the appearance of the new control pulses 5—11 so that the lower channel, generating saw-tooth wave 5—13, could be adjusted so as to position this saw-tooth wave in any desired time relationship with respect to the transmitted pulse. This enables one to select any desired portion of the full range for reproducing the selected portion on a faster sweep 5—13.

In order to suppress the cathode-ray beam during the inactive periods, a positive bias is applied to a cathode 372 through a potentiometer arm 374 connected to a bleeder resistor 376. This cathode bias prevents the cathode-ray beam from normally reaching the oscilloscope screen during the return and the inactive periods of the operating cycle. To overcome this bias during the desired active periods of the sweeps, the outputs of the multivibrator circuits 346 and 348 are connected to an intensity amplifier and mixer 354 which in turn is connected to an intensity grid 356 of tube 324 through a potentiometer 358.

To facilitate range determinations, the cathode-ray tube is provided with a special circuit which intensifies its beam at predetermined intervals, thus producing regularly spaced markers 1004, Fig. 10, on the screen of the range oscilloscope. This is accomplished by impressing the output of buffer, phaser, and shaper 332 on an isolating amplifier 360, a range marker 362 and a second isolating amplifier 364. Range marker 362 comprises a short duty cycle free oscillating multivibrator which is time-phase synchronized with the starting periods of the saw-tooth waves by means of pulses 5—23 impressed upon it by the isolating amplifiers 360. The output of the range marker consists of a series of uniformly spaced peaked voltage pulses 5—24 which are combined in a video amplifier and mixer 312 with the output of receiver 310 producing a composite signal 5—30; this is impressed on cathode 372 producing intensity modulation of the cathode-ray beam. The final results as they appear on the screen of the cathode-ray tube are illustrated in Fig. 10, with the echoes appearing at 1006, 1010 and the markers at 1004. Sweep 1002 to 1012 is a long range sweep, and sweep 1002 to 1014 is a short range or a vernier sweep.

The operation of the system illustrated in Fig. 3 is as follows: transmitting antenna 308 is pointed directly at north and indexing wheel 330 is used for pointing or aligning the cathode-ray beam so that it sweeps from the center 1002, Fig. 10, to the point marked 0° on the angular scale of the screen. With this alignment of the antenna array beam and of the coil 322 accomplished, the antenna array beam and the radially deflected cathode-ray beam will then point in the same direction. The system is now ready for operation and the exploratory pulses are transmitted scanning the field by means of antenna 308, which is now made to turn at uniform speed by driving motor 316. Since there is an electro-mechanical connection between the rotating shaft of antenna array 308 and coil 322, the beam of the oscilloscope tube will be following the beam of the antenna array. The sweep circuits are synchronized with the transmitted pulse so that sweeps 5—17 and 5—13 start the deflection of the beam from its normal central position 1002, Fig. 10, toward the periphery of the screen at the instant of the transmission of the exploratory pulse. The timing as well as the duration of the sweeps are so adjusted that while sweep 5—17 results in the deflection of the beam along one radius (Radius 1002—1012, Fig. 10) at the instant of transmitting the first pulse, sweep 5—13 starts the deflection of the beam at the instant of transmitting the second exploratory pulse along the radius which is substantially diametrically opposite the first radius (Radius 1002—1014, Fig. 10). The signals impressed on cathode 372 of the P. P. I. oscilloscope by receiver 310 and amplifier and mixer 312 will be reproduced, therefore, first along one sweep and then along the other sweep on the diametrically opposite sides of the tube, as illustrated at 1006, 1008 and 1010 in Fig. 10, the duration of the saw-tooth waves being so adjusted that sweep 5—13 acts as a vernier sweep for the full range sweep 5—17. The occurrence time of the vernier sweep may be varied for reproducing any desired portion of the full range. This mode of adjusting the sweeps is not the only mode of operation that is described in this specification, and other modes of operation and relative adjustments of the sweep circuits will be more fully described later, especially in connection with the description of Figs. 6, 7 and 12. As mentioned previously, the cathode-ray tube 324 is normally biased to cut off and the intensity grid 356 overcomes this blocking potential during the linear periods of the sweep waves 5—17 and 5—13 without producing any fluorescence on the screen. Because of interference signals, however, some degree of fluorescence is nevertheless present when the blocking potential is removed, and it is this fluorescence that is indicated by the shade lines in Fig. 10. Since a more detailed description of the circuits as well as the functioning of the oscilloscope circuits appears later in this specification in connection with the description of the Figs. 4, 6 and 7, in order to avoid repetition, only the brief description of the operating cycle given thus far appears sufficient at this time.

Reference is now made to Fig. 4, which is a block diagram of the oscilloscope circuit. From the description given thus far, it should be apparent that the oscilloscope circuit may be conveniently divided into several main components, or channels, which perform specific, independent functions of the operating cycle. Since the P. P. I. oscilloscope now has two independent sweep circuits which alternately exert their influence upon the beam of the oscilloscope tube, it is apparent that one must have two independent sweep generating channels, channel No. 1 generating a long sweep for reproducing the entire range, and No. 2 channel, if one is to use it as a vernier device, generating a sweep which is faster but of equal amplitude. The system disclosed in Fig. 4 will be described in connection with that mode of operation where No. 2 sweep channel generates a faster sweep, and, therefore, is used as a vernier for No. 1 sweep channel. However, means are provided for varying the duration of No. 2 sweep so that it can be made either shorter or equal to the duration of No. 1 sweep. If one is to operate the oscilloscope circuit in connection with the synchronous radio locator, circuits must be provided for modifying the sinusoidal wave generated by the synchronizing oscillator into short, periodic pulses which could be conveniently used for controlling the timing of the two sweep channels. Moreover, additional circuits must be provided for producing the range markers and for suppressing the reproduction of the undesirable idle and return periods on the oscilloscope screen. All of these elements are illustrated in a block form in Fig. 4, and their relative positions in this figure is as follows: No. 1 sweep channel appears in the upper portion of Fig. 4 at 400; No. 2 sweep channel 402 appears directly below the first channel; the range marker channel 404 is directly below the No. 2 sweep channel, and the synchronizing pulse shaping channel 406 is at the bottom of Fig. 4. The P. P. I. oscilloscope tube 324 is at the right portion of Fig. 4. There is an identical showing of some of the elements in Figs. 3 and 4. When this is the case, they bear the same numerals in both figures.

Referring now to a more detailed description of the respective channels, and beginning this description with the synchronizing pulse shaping channel 406, it consists of a synchronizing oscillator and a buffer amplifier 410 connected on one side to a phaser 412 and on the other side to a line amplifier 414; the latter in turn is connected to a keyer 12, Fig. 1 over an outgoing conductor 416 where the sinusoidal wave generated by the synchronizing oscillator 410 is eventually utilized for keying the transmitter and for controlling the periodicity of the transmitted exploratory pulses. Phaser 412 is used for the initial cophasing of the transmitting, receiving and sweep channels so that the full range radial sweeps generated by the No. 1 sweep channel would always begin simultaneously with the appearance of the transmitted exploratory pulse at cathode 372. Once this cophasing operation has been accomplished, the setting of phaser 412 remains fixed. The sinusoidal wave appearing in the output of phaser 412 is impressed on a shaping amplifier 418 which transforms it into a rectangular wave 5—3 (these waves may also be found in Fig. 5), and impresses it on a differentiating network 420 which in turn transforms them into a series of positive and negative pulses 5—4. These are impressed on a clipping and shaping amplifier 422 which is biased beyond cut off so that the negative pulses are eliminated and only the peaks of the positive pulses get through. The resultant negative rectangular voltage pulses 5—5 are used to control the sweep and range marker channels. From the description of the synchronizing pulse shaping channel it follows that it transforms the sinusoidal output of oscillator 410 into a series of rectangular negative pulses 5—5, one pulse per each cycle of the sinusoidal wave.

These are impressed on a frequency divider multivibrator 336 which generates a rectangular wave 5—6, the periodicity of which is one half of the periodicity of the sinusoidal wave of the synchronizing oscillator 410 (compare 5—1 and 5—6 in Fig. 5). The rectangular wave 5—6 is impressed in parallel on two differentiating networks and separators 340—341 which represent the input circuits of the two sweep channels. The differentiating networks and the separators, the latter comprising diodes, transform the rectangular wave 5—6 into a series of positive and negative pulses 5—7 and 5—14. A shaping amplifier 430 in the No. 1 sweep channel is connected to the plate of the rectifier so that it is controlled by the negative pulses 5—14, while a shaping amplifier 432 in the No. 2 sweep channel is connected to the cathode of the rectifier in its channel so that it is controlled by the positive signals 5—7. The phase or time relationships of these signals is clearly indicated in Fig. 5; they are separated from each other by one period of the sinusoidal wave 5—1. The shaping amplifiers 430 and 432 transform these pulses into rectangular pulses 5—9 and 5—15. Sweep channel No. 2 is provided with a precision delayed multivibrator 345 which generates a rectangular wave 5—10; the duration of the latter may be varied by varying the biasing potential impressed on the control grid of the first tube of the multivibrator circuit. This multivibrator is used in the lower channel, as it may be recalled from the description of Fig. 3, for varying the time of occurrence of the saw-tooth wave generated by the No. 2 sweep channel so that any portion of the full range may be reproduced on an expanded scale provided by this channel.

With the exception of the precision delayed multivibrator 345, the remaining elements of the two sweep channels are identical in all respects. In the upper channel the rectangular pulses 5—15 are impressed on a full range multivibrator 436 which generates a rectangular wave 5—16 the duration of which corresponds to the duration of a full range sweep wave 5—17 appearing in the output of a sweep generator 438. After being amplified in a sweep amplifier 440, the current saw-tooth wave 5—17a is impressed on the rotating coils 322. A clamper circuit 446 is provided which stabilizes the position of the zero range center point 1002, Fig. 10, on the screen of the oscilloscope. No. 2 sweep channel is provided with the identical elements as the corresponding elements in the No. 1 sweep channel with the exception that a vernier range multivibrator 448 is so timed that the duration of a rectangular wave 5—12 is equal to the duration of the vernier sweep 5—13 and is, therefore, of shorter duration than the rectangular wave 5—16. A sweep generator 450, a clamper 454, and a sweep amplifier 452, perform the same functions as the corresponding elements in the No. 1 sweep channels. When the current saw-tooth waves 5—13a and 5—17a are impressed on the coils 322, a saw-tooth wave current flows first in one direction and then in the opposite direction as illustrated at 5—18 in Fig. 5. This produces the bi-radial sweep and deflection of the cathode-ray beam first along one radius and then along the other radius which is diametrically opposite the first.

Since the cathode 372 is normally above the ground potential impressed by potentiometer 376, over conductor 374, the cathode-ray beam normally does not reach the fluorescent screen of the tube, and, therefore, all undesirable periods of the operational cycle of the tube remain normally suppressed. To reproduce the echoes during the useful portions of the cycle, the intensity grid 356 is connected to a potentiometer 358 which impresses a positive potential on the intensity grid during the linear portions of the two saw-tooth waves. This is accomplished by impressing the outputs of the multivibrators 436 and 448 over conductors 462 and 464 on an intensity amplifier and mixer 354 as it has been already described in connection with the description of Fig. 3.

The only remaining components in Fig. 4 are the range marker channel 404 and the video amplifier and mixer 312. These elements have been already described in connection with the description of Fig. 3.

The composite signal impressed on cathode 372 is illustrated at 5—38 in Fig. 5, and the effect that it produces on the oscilloscope screen is illustrated in Fig. 10, the center of the oscilloscope screen being at 1002, the marker signals appearing as bright spots 1004 and the echoes appearing at 1006, 1008 and 1010. In Fig. 10, sweep 1002 and 1012 is a long range sweep, and sweep 1002, 1014 is a short range or a vernier range sweep.

As mentioned previously in connection with the description of Fig. 2, the bi-radial sweep oscilloscope circuit is suitable for operation either with a synchronous radio locator, Fig. 1, or a self-synchronous system Fig. 2. The alternative connections for the self-synchronous operation are illustrated in Fig. 4 by the conductor 334 and the switches 335 and 337. These connections have been already described in connection with the Figs. 2 and 3.

Referring now to Figs. 6 and 7, the relationship of which with respect to each other is illustrated in Fig. 11, these figures being the schematic diagram for the bi-radial oscilloscope sweep circuit, the disposition of the channels in these figures is as follows: reading from top to bottom of Fig. 6, one has the synchronizing pulse shaping channel 406, the range marker channel 404, and the video amplifier and mixer 312; the frequency divider multivibrator 336 appears in the upper right corner of Fig. 6, and the two sweep channels 400 and 402 appear in the upper and lower portions of Fig. 7, with the intensity amplifier and mixer 354 appearing in the central portion of Fig. 7; the oscilloscope tube 324 appears in the right portion of Fig. 7.

Proceeding now with the description of the synchronizing pulse shaping channel 406, it begins with a synchronizing oscillator pentode T—1 generating the sinusoidal wave 5—1. As in Figs. 3 and 4, the oscillogram numerals in Figs. 6 and 7 correspond to those of Fig. 5, Fig. 5 illustrating the wave forms as well as the time relationship between the respective oscillograms. Any oscillator circuit may be used for the purpose at hand, and no special frequency stability is necessary in this case since all circuits connected to the oscillator follow the oscillator voltage even though an occasional frequency drift does occur. The output of T—1 is impressed in series on two buffer amplifiers T—2 and T—3, the output of the latter being connected through an impedance matching transformer 602 and conductors 604 to keyer 12, Fig. 1 where it is eventually utilized for periodic keying of transmitter 14. The output of buffer amplifier T—2 is connected through a transformer 606 to a phase shifter consisting of a variable resistor condenser combination 608, 610, a double pole-double throw switch 607, and a centrally tapped secondary of transformer 606. This phase shifter, as it may be recalled from the description of Fig. 4, is used for the initial cophasing of the sweep channels 400 and 402. The phase shifters of this type are well known in the art and do not need any detailed description. The sinusoidal wave appearing in the output of the phase shifter is impressed on a shaping amplifier T—4 which is overdriven in both positive and negative directions by the sinusoidal wave. An approximately rectangular wave 5—3 appearing in its output is impressed on a differentiating network 612—614 where it is transformed into positive and negative pulses 5—4, which are impressed on the control grid of a negatively biased amplifier T—5; the latter eliminates the negative signals and reshapes the positive signals into substantially rectangular negative voltage pulses 5—5. These are impressed in parallel on an Eccles-Jordan multivibrator circuit consisting of triodes T—6, T—7, and on an isolating and inverting amplifier T—8, the output of the latter being used in the range marker channel 404 which will be described later. The Eccles-Jordan multivibrator circuit is well known in the art and does not need any detailed description. It may be remarked parenthetically nevertheless that it has two degrees of stability, one tube being fully conductive while the other tube is nonconductive, and vice versa the conductivities of the tubes being controlled by either positive or negative pulses impressed in parallel on their control grids. Once put into one state of stability, the circuit remains in this position indefinitely until it is put into the other state by the control pulse impressed on the control grids of the two tubes. The voltage signal appearing in the plate circuit of tube T—6 is a rectangular wave 5—6. Switch 335 interconnecting triodes T—5 and T—6 corresponds to the same switch in Figs. 3 and 4; it may be recalled that this switch is used for disconnecting the oscilloscope circuit from the synchronizing pulse shaping channel 406 when it is desired to use the oscilloscope in connection with the self-synchronous radio locator. When this is the case, the sychronizing voltage signals impressed on the control grids of T—6 and T—7 over conductor 334 come from the line pulse modulator 200, Fig. 2. No inverter amplifier is indicated in any of the figures between the line pulse modulator 200 and multivibrator 336 since actual experience indicated that multivibrator 336 functioned equally well when its conductivty positions were controlled either by the positive or negative control signals. However, if it is desired to control it by means of positive signals, an inverter may be inserted in conductor 334. The rectangular wave 5—6 is impressed in parallel over conductors 616 and 707 on two differentiating networks consisting of condenser resistance combinations 703, 705, 700 and 704. Here it is transformed into a series of positive and negative pulses which are impressed on the plate and cathode of diodes T—9 and T—10 respectively. Diode T—9 is rendered conductive by the positive pulses and diode T—10 is rendered conductive by the negative pulses.

The voltage signal impressed on the control grid of T—11 is illustrated at 5—7. Since the control grid of T—11 is coupled to the cathode resistor 701 of diode T—9, the signals impressed on this grid have positive polarity since the negative signals have been by-passed to ground by resistance 704 without producing any drop in the cathode resistor 701. Diode T—9 represents the beginning of No. 2 sweep channel 402. Proceeding now with its description, triodes T—11 and T—12 represent two shaping amplifiers which transform signal 5—7 impressed on the control grid of T—11 into a rectangular pulse 5—9. Triode T—11 is overdriven by signal 5—7 so that an approximately rectangular pulse 5—8 appears in its output. Triode T—12 is normally conductive and is overdriven in the negative direction by the negative pulse 5—8 so that its output represents a substantially rectangular pulse 5—9. This is impressed on a potentiometer 704 which is connected to the control grid of a triode T—13 through a coupling condensor 706. Triodes T—13 and T—14 represent a precision delayed multivibrator circuit which is used for generating a rectangular wave 5—10 of adjustable width. This multivibrator comprises a twin triode biased multivibrator, the width of the output pulse of which is a linear function of the grid bias impressed on the grid of the first triode T—13 by a biasing battery 707 and a potentiometer 708 through a grid resistor 710. Potentiometer 708 comprises that source of variable biasing potential which is used for controlling the width of the rectangular wave 5—10 appearing in the output circuit of triode T—13. The common cathode of the triode is connected to ground over a cathode resistor 712 and the plates are connected to a positive source of potential 714 over resistances 716 and 718. The grid of triode T—14 is coupled to the plate of triode T—13 over a condenser 720, and to the positive source of potential 714 over a resistance 722.

The operation of this multivibrator circuit is as follows: normally, the second triode T—14 is conductive since this grid is held at approximately the cathode potential by the grid current through the large grid resistance 722. The voltage drop through the common cathode resistance 712 is sufficient to make the cathode positive with respect to the grid of the first triode T—13 which is, therefore, nonconductive. Condenser 720 is charged to a voltage equal to a potential difference between the plate of T—13 and the grid of T—14 because of the small grid current drawn by T—14. A positive trigger voltage 5—9 is applied through a small coupling condenser 706 to the grid of T—13. The time constant of the grid circuit of T—13 is made very small (in the order of one quarter of one microsecond), so that only high frequency components of the trigger signal passes into the grid circuit. A diode may be used between T—12 and T—13 to insure that the voltage applied to the grid is positive. A positive trigger of about 0.2 microsecond results and T—13 thereby becomes conductive. The plate voltage of T—13 drops, and through condenser 720 the grid of T—14 is driven below the new cathode potential. The cathode potential falls immediately after the trigger pulse to a value which is determined by the grid bias impressed on the grid of T—13 by potentiometer 708. In this condition T—13 is conducting and T—14 is nonconducting.

As the grid of T—14 is no longer conducting, condenser 720 discharges through the resistances 722 and 718, and the grid potential of T—14 rises to the point at which T—14 begins to conduct. At this point T—13 is cut off and the multivibrator returns to the quiescent condition. The change occurs very rapidly and in a regenerating fashion. With the beginning of the current in T—14 the cathode potential rises to cut off T—13, which in turn raises the grid potential of T—14 through condenser 720 increasing the current in T—14.

The pulse width can be altered by changing the values of the resistance 722, condenser 720, resistance 712, or the grid potential impressed on the grid of T—13 by potentiometer resistance 708. The variation of the grid potential is actually the most convenient method of controlling the pulse width. Its principal effect occurs in changing the cathode potential when T—13 is conducting and thereby changing the amount condenser 720 must discharge before T—14 begins to conduct. It also varies the plate voltage of T—13 when the latter is conducting. It may be shown experimentally as well as theoretically that this, together with the curvature of the grid-plate characteristic of T—13, results in a high degree of compensation of the inherently non-linear relationship between the voltage and discharge time of condenser 720. Because of the highly accurate linear relationship between the pulse width and the grid voltage, the multivibrator composed of the tubes T—13 and T—14 is here referred to as a precision delayed multivibrator. This highly accurate linear relationship between the pulse width or the duration of the duty cycle of this multivibrator and the grid voltage is utilized for changing the time of occurrence of the saw-tooth wave generated by the No. 2 sweep channel and for determining the range up to that point at which the vernier range begins. Therefore, the range reading in this case consists of the range reading as it appears on the calibrated scale of potentiometer 708 plus the reading of the vernier sweep. Moreover, the calibrated potentiometer 708 is used for quickly selecting the desired portion of the full range for its reproduction on the vernier range.

The rectangular wave 5—10 is impressed on a differentiating network 724—726, which transforms it into a series of positive and negative pulses 5—11. These are impressed on the control grid of the first tube of a second delayed multivibrator circuit consisting of triodes T—15 and T—16; the connections and the functioning of which is identical to those of the precision delayed multivibrator T—13, T—14 with two exceptions: the biasing potential impressed on the control grid of T—15 remains fixed, while the time constant of a resistance-condenser combination 728—730 is made adjustable so that in this multivibrator it is the parameter of the second control grid that is made variable for varying the width of the rectangular wave 5—12 appearing in its output. It is the duration of this rectangular wave that determines the duration of the linear portion of the No. 2 sweep. Therefore, multivibrator T—15—T—16 circuit is adjusted so that the duration of rectangular wave 5—12 corresponds to the desired range span on the vernier sweep.

The rectangular wave 5—12 is impressed on the control grid of a triode T—17 which comprises a "single-ended" saw-tooth oscillator of No. 2 sweep channel. The control grid of T—17 is connected to the bleeder resistor 714 which impresses positive potential on this grid through a grid resistor 732; therefore, T—17 is normally fully conductive so that a sweep generating condenser 734 is normally kept in a substantially discharged condition. This condenser is connected across the output of T—17 through a variable resistance 736, the latter being shunted by a condenser 738. The plate of T—17 is connected to a positive source of potential 114 over a plate resistor 740 and an isolating resistor 742, the latter being shunted to ground by a filtering condenser 744. When the negative rectangular wave 5—12 is impressed on the control grid of T—17, it renders this grid negative and T—17 nonconductive. The voltage across condenser 734, which was quite low because of the IR drop in the plate resistors as long as T—17 remained fully conductive, now instantaneously jumps up to an intermediate positive potential due to the instantaneous IR drop appearing across resistor 736. After reaching this intermediate potential, condenser 734 begins to charge resulting in a linear portion of the sweep wave 5—13. This initial abrupt start of the voltage sweep wave 5—13 is necessary because it is later impressed on the rotating yoke coils 322 which have considerable inductance, and it is only the voltage of this form that can produce a linear current wave in these coils and a linear change in the beam deflecting flux in the oscilloscope tube. Variable condenser 738 is provided for adjusting the initial wave front of the voltage wave 5—13; the smaller this condenser is, the more instantaneous is the initial rise of the voltage wave. Resistor 736 may be a variable resistor so that proper initial voltage rise may be obtained at condenser 734. Thus, in order to produce eventually a linear sweep by means of the rotating coils 322, the voltage wave 5—13 may need some adjustment by means of condenser 738 and resistance 736 until the desired linear current saw-tooth wave is obtained. While condenser 738, when varied, may make the sudden voltage rise either more or less abrupt, variation of resistance 736 will make the amplitude of this rise either higher or lower. The voltage wave 5—13 is applied to the grid of a beam power tube T—18, which, after linear amplification of this wave, impresses it on the rotating coils 322 over a conductor 748. The cathode-plate circuit of this tube is as follows: cathode 749, conductor 748, coils 322, ground 750, a grounded source of potential 114, and a plate 751. The A. C. grid circuit of this tube is through a condenser 752, resistance 740, condenser 744, grounded bus 755, ground 750, coils 322, conductor 748 and cathode 749.

In order to stabilize the central position of the beam on the cathode-ray oscilloscope, the control grid of T—18 is also connected to a "clamper" circuit consisting of tubes T—19 and T—20 which act, when conductive, as two variable uni-directional resistances connecting control grid 754 to a grounded tap 758 through a bleeder resistor 756. These tubes "clamp," or hold, the grid potential of the power amplifier tube T—18 at a steady, fixed potential which renders T—18 nonconductive when no saw-tooth wave is impressed upon it. It is essential that amplifier T—18 always returns to and retains exactly the same cut-off potential after impressing the saw-tooth current wave on the coils 322 for two reasons: first, this tube should remain continuously nonconductive during its inactive period so that it does not interfere with the saw-tooth wave 5—17a impressed on the coils 322 by the second power amplifier T—27 of the No. 1 sweep channel; and, second, T—18 must always return to exactly the same that when the next saw-tooth wave is impressed upon it, it will start amplifying this wave from that fixed cut-off point thus impressing on the deflection coils 322 current saw-tooth waves of the continuously equal amplitudes. That this must be the case is not difficult to understand, since it has been previously stated that the accuracy of all range determinations depends upon the fact that the sweep always starts from the center on its outward radial journey, and that the range is determined by measuring the radial distance from this center to the image of an echo on the oscilloscope screen. Any lack of stability in the circuits of T—18 would immediately result in a "wandering zero range point" and inaccurate range determinations.

Proceeding now with the description of connections of the clamper circuit, the clamper tubes T—19 and T—20 are connected to a separate source of potential shown as a bleeder resistor 756, an intermediate point 758 of which is connected to ground. The resistor is by-passed to ground by condensers 763 and 765. The plate of T—19 is connected to the positive end of resistor 756, while the cathode of T—20 makes a potentiometer type connection with the same resistor through a potentiometer arm 761 connected to a point which is below the ground potential. The potentiometer arm 761 and the ground tap 758 are so positioned on resistor 756 that sufficiently negative potential is impressed on the control grid of the power amplifier tube T—18 so as to normally render T—18 nonconductive. The fact that the positions of the potentiometer arm 761 and of tap 758 determine the biasing potential normally impressed on the control grid of T—18 will become more apparent from the description of the functioning cycle of the clamper circuit. The control grids of T—19 and T—20 are connected in parallel to a coupling condenser 760 and to a grid resistor 757, the other end of which is connected to the positive end of resistor 756. Normally, tubes T—19 and T—20 are both conductive because of the full plate potential initially appearing on the control grids of these tubes. When this is the case, tube T—20 becomes conductive and current flows from the cathode of this tube to the control grid and the plate of tube T—20. This current at once enables tube T—19 to become conductive so that the two tubes conduct a series current from the cathode of tube T—20 to the plate of tube T—19. The grid current carried by the control grid of T—20 produces an IR drop in the grid resistor 757 so that this grid assumes a potential which is only slightly above the ground potential. At this instant tube T—20 carries two currents: one current is from the cathode of T—20 to its control grid, this current taking place because, even though the control grid is not very far removed from the ground potential, the cathode of T—20 is below the ground potential thus making this current possible; the second current is from the cathode of T—20 to its plate, and it is this current that mainly determines the potential between ground and the control grid of T—18 at this instant. By adjusting the positions of the potentiometer arm 761 and ground tap 758 on the bleeder resistor 756, the conductivity of T—20 may be controlled thus controlling the potential appearing on the control grid of T—18. Referring again to the current flowing in series through the two tubes from the cathode of T—20 to the plate of T—19, it is apparent that the potential impressed on this series circuit by resistor 756 pedances of the two tubes. Because of different grid-to-cathode voltages, these impedances will not be equal, and, therefore, the potential drop across T—20 will be lower than the potential drop across T—19. These grids are always at the same potential to ground, while the cathode of T—20 is always at a much lower potential to ground than the cathode of T—19; therefore, T—20 will be always more conductive than T—19, the excess current carried by tube T—20 that is not carried by the plate of T—19 being diverted to the control grid of T—20. The entire circuit is so adjusted by adjusting the potentiometer arm 761 and ground tap 758 that the voltage drop across tube T—20 is considerably lower than the same voltage drop across tube T—19, and the grid of tube T—18 is at its cut-off potential when tubes T—19 and T—20 are in their normal conductive state.

If at this instant, any interference signals appear across the coupling condenser 752, they are immediately discharged either across tube T—19 or tube T—20 so that the control grid of T—18 retains its constant potential with respect to ground. When the signals impressed by the coupling condenser 752 are of negative polarity, they decrease the conductivity of T—20 and increase the conductivity of T—19 in proportion to the disturbance created by the condenser and this change in the conductivities of the tubes immediately restores the potential of the control grid of tube T—18 to its normal value. The same is true when the interference potentials are of positive sign, except that in this case T—20 becomes more conductive and T—19 less conductive. The control grids of T—19 and T—20 are connected to the output of T—15, the first tube of the multivibrator over a coupling condenser 760 which periodically impresses upon these grids the negative rectangular wave 5—12 rendering these grids negative with respect to the cathodes. The circuit of condenser 760 is: resistor 757, grounded condenser 765, grounded bus 755, condenser 729, plate resistor 731, and condenser 760. When the negative rectangular wave is impressed across the grid resistor 757 and the tubes T—19 and T—20 become nonconductive, they are transformed into high impedance devices, and, therefore, current amplifier tube T—18 can now amplify the sweep wave impressed upon its control grid at this instant by the sweep generator T—17.

Referring now to No. 1 sweep channel, it begins with a differentiating network 703—705 connected to a diode T—10. This diode is rendered conductive by the negative signals so that its plate output appears as a negative signal 5—14. This signal overdrives a normally conductive shaping triode T—21 in the negative direction resulting in a rectangular pulse 5—15. It is impressed on a delayed multivibrator consisting of triodes T—22, T—23 which correspond to the same type of multivibrator, consisting of tubes T—15 and T—16, in the No. 2 sweep channel. A rectangular wave 5—16 appearing in the plate circuit of triode T—22 is impressed on the control grid of a saw-tooth generator T—24 and "clamper" tubes T—25 and T—26. The clamper tubes are connected to the control grid of a power amplifier T—27 which is connected to the coils 322. The functioning as well as the connections of these elements is identical to those in channel No. 2, and, therefore, need no additional description.

Comparing the connections and the elements in the No. 1 and No. 2 sweep channels, one may readily see that there is no precision delayed multivibrator circuit in No. 1 sweep channel while there is one in channel No. 2. Accordingly, No. 1 sweep channel, and especially its multivibrator T—22—T—23, is so adjusted that the generated sweep corresponds to the maximum range of the system, and its duration as well as its position with respect to the transmitted signal remain fixed. In the No. 2 sweep channel, while the duration of the saw-tooth wave 5—13 also remains fixed, its time of occurrence with respect to the transmitted signals may be varied. The voltage waves impressed on the deflection coils 322 of the cathode-ray tube 324 are illustrated at 5—18 in Fig. 5; the time position of the positive voltage wave may be varied, as illustrated by an arrow appearing above this wave.

To overcome the negative biasing potential normally impressed on the cathode 372 of the oscilloscope tube 324, the intensity grid 356 is connected to the intensity amplifier and mixer 354, and especially to its output potentiometer 358, which impresses a series of positive rectangular waves on this control grid simultaneously with the appearance of the linear portions of the saw-tooth waves 5—18 in the coils 322. To accomplish this result, the output of the first tube of multivibrator T—22—T—23 is impressed on a normally fully conductive isolating and inverting triode T—28. Its output 5—20a is impressed on a second amplifier T—29, the cathode of which is coupled to the output potentiometer 358. The signal impressed on potentiometer 358 is illustrated at 5—21 in Fig. 5 by the second rectangular wave. The same type of circuit consisting of tubes T—30 and T—31 is used between the potentiometer 358 and No. 2 sweep channel. Here the negative wave 5—12 is transformed into a positive wave 5—19a which appears in the potentiometer resistance 358 after being cathode coupled by a triode T—31. The final waves impressed on the intensity grid 356 appear at 5—21. By comparing the time relationships between the saw-tooth waves 5—18 and the rectangular waves 5—21 in Fig. 5, one may very readily see that the intensity grid 356 is rendered positive only during the linear portions of the saw-tooth waves. The potentiometer 358 is ordinarily so adjusted that the cathode-ray beam does not quite reach the screen of the cathode-ray tube 324 under normal conditions. Radio locators ordinarily suffer from interference, and this may result in overcoming the biasing potential even when no echoes proper are impressed on the cathode 372 of the tube. The potential impressed on the intensity grid 356 may be adjusted so that even the interference signals are completely suppressed, but such biasing potential may not be necessarily the optimum setting since this may suppress some of the weak echo signals. A better practice, therefore, is to adjust the setting of potentiometer 358 so that the interference signals produce only a minor fluorescence on the screen of the oscilloscope tube 324.

The outputs of receiver 310, Fig. 3 and range marker channel 364 are impressed on the cathode of tube 324 where they overcome the positive biasing potential impressed on this cathode by the bleeder resistor 376, and produce the marker images 1004 and the echo images 1008 and 1010, Fig. 10 on the oscilloscope screen. This positive biasing potential is impressed over the following circuit: bleeder resistor 376, a conductor 768, a resistor 766, a double pole-double throw switch 764 and a conductor 770. The range marker channel 404 consists of a normally fully conductive isolating triode T—8 which linearly amplifies the rectangular pulses 5—5 impressed upon it by triode T—5. The positive voltage pulses 5—22 appearing in the plate circuit of this triode are transformed into pulses 5—23 by an inverter amplifier T—32 which impresses them on the control grid of triode T—33. Triodes T—33 and T—34 comprise a short duty-cycle, self-oscillating multivibrator the frequency of which is adjusted by means of a variable cathode resistor 630 so that it generates a series of uniformly spaced rectangular pulses 5—24, the spacings between which represent some chosen distance on the screen of the range oscilloscope. For example, if the full range of the system is 350 miles, it may be adjusted so that it generates marker signals 5—24 at such convenient intervals as 10 or 20 miles. The output of amplifier T—32 phase-synchronizes multivibrator T—33—T—34 insuring simultaneous appearance of the zero range marker signal and of the exploratory pulse on cathode 372 of the cathode-ray tube 324. The output of the multivibrator is impressed through an isolating and inverting amplifier T—35 on the control grid of a mixer tube T—38 in the video amplifier and mixer channel 312.

The video amplifier and mixer channel 312 is connected over a conductor 311 to the output of receiver 310, Fig. 3. Positive voltage signals 5—26 of the receiver are impressed on the control grid of a linear amplifier T—36, and then on a diode T—37. The latter operates as a D. C. restorer which eliminates any positive voltage signals that may appear in a coupling circuit 636, 638. The negative signals 5—27 and 5—25 are impressed on the control grid of the mixer tube T—38, which combines the output of receiver 310 with the output of the range marker channel 404, and also limits the amplitude of these signals to a predetermined maximum value illustrated at 5—29. These signals are impressed on a power amplifier and inverter tube T—39 which transforms them into a series of negative pulses 5—30 and impresses them over a conductor 640, a coupling condenser 762, a double pole-double throw switch 764, a resistor 766 and a conductor 768 on cathode 372 of the cathode-ray tube 324. A second D. C. restorer diode T—40 is connected across resistor 766 which acts as a low impedance path for the signals which make its plate positive with respect to its cathode thus preventing their appearance on cathode 372.

The power amplifier and inverter T—39 is provided with a switch 642 which connects conductor 640 either to the plate or the cathode of T—39. When switch 642 is in its upper position and conductor 640 is connected to the plate of amplifier T—39, negative voltage signals are impressed on the coupling resistor 766, and if the double pole-double throw switch 764 is thrown to the left in this case, negative signals will be impressed on cathode 372, which will result in the generation of fluorescent images on the screen of the cathode-ray tube. If it is desired to reproduce the echoes as black images, switches 642 and 764 may be thrown to their opposite positions, which will at once result in the reversal of the signals impressed on cathode 372, and the eventual reversal of the images on the screen of the oscilloscope tube. When the echoes and the markers are reproduced as black images, the potentials impressed on the cathode and the intensity grid 356 reach the oscilloscope screen and produce an even glow on its face.

The output of the shaping amplifier T—12 is connected over a conductor 780 to a three-position switch 782, the rotating arm of which is connected to a grounded bus 784. When switch 782 is on terminal 1, bi-radial sweep operation is obtained but if this switch is connected to the No. 2 terminal, it grounds the output of the shaping amplifier T—12 so that No. 2 sweep channel does not generate any saw-tooth wave. With the shaping amplifier T—12 grounded, the oscilloscope tube 324 reproduces only the No. 1 sweep and the associated signals. This type of operation may be called as a one sweep channel operation, and, therefore, resembles a conventional mode of operating the P. P. I. systems, except that every other exploratory pulse and the resulting echoes do not appear on the oscilloscope screen. The same mode of operation may be obtained for No. 2 sweep by turning switch 782 to terminal No. 3, thus grounding the output of the shaping amplifier T—21. As previously mentioned in this specification, the rotating speeds of antenna 308, Fig. 3, may be in the order of from one to twenty revolutions per minute, or even higher, but it is more usual to encounter rotational speeds in the order of 1 to 2 R. P. M.'s rather than the higher limits. When the antenna rotational speeds are in the order of 1 to 2 R. P. M.'s and the keying rate of transmitter 304 is in the order of 300 cycles per second, very satisfactory results are obtained on the oscilloscope screen without any overlapping of the bi-radial images when the retentivity of this screen is in the order of P—7 screen, R. M. A. code. However, as the rotational speed of the antenna is increased above 2 R. P. M. with the keying rate remaining constant, because of the relatively high retentivity of the P—7 screen, considerable glow may be retained on the screen at the trailing ends of the sectors up to the time of appearance of the following sector resulting in a simultaneous reproduction of signals by the two channels over the same screen sectors. This would obviously result in the confusion of the images on the oscilloscope screen. The three position switch 782 is provided for eliminating this confusion. By setting this switch to the previously mentioned positions, either of the two channels may be completely eliminated thus avoiding the above-mentioned overlapping of the images.

In Figs. 3 and 12 a sector scanning arrangement is disclosed, which enables one to scan either a 180° sector, or a smaller or larger sector, depending upon the configuration of the conducting segments of a commutator provided for this purpose. This sector scanning arrangement becomes desirable when the angular speed of antenna is greater than 2 R. P. M. Provisions are also made for slowly rotating about the center of the oscilloscope screen the scanned sector at the rotational speeds less than 2 R. P. M. The latter arrangement enables one to retain all the advantages of the bi-radial sweep display through 360° of azimuth at the antenna rotational speeds which are higher than 2 R. P. M.

Referring to Figs. 3 and 12, the intensity grid 380 of the cathode-ray tube 324 is connected to a positive source of potential 376 over conductors 384, 389, 392, brushes 385, 387, 391, and slip rings 386, 388 and 390. The slip rings may be shorted by means of a knife switch 393 thus connecting the intensity grid directly to the bleeder resistor to Fig. 12 more in particular, the 180° segment 388 is rotated around the longitudinal center line of the oscilloscope tube 324, which is represented as a center point 1200 in Fig. 12. Segment 388 is mounted on the rotating ring 329, which also acts as a mounting means for the deflection coils 322, and, therefore, is rotated by the "Selsyns" 318 and 320, Fig. 3. Brush 387, which is mechanically mounted on the slip ring 386 makes an electrical contact with segment 388. The slip ring 386 is mounted on a gear 1204, the latter being connected through a worm gear 1206 to a motor 1208. The slip ring 390, which revolves around the same center 1200, and is also mounted on ring 329, is electrically connected through brush 391 and conductor 392 to the intensity grid 380. Ring 390 and segment 388 are interconnected by means of a conductor 389. When switch 393 is closed, the commutating arrangement is shorted, and grid 380 is connected directly to source 378 over switch 393. With switch 393 closed, 360° azimuth scanning is obtained.

When the angular speed of antenna 308 is above a certain limit, or only a sector scanning is desired, it becomes necessary to extinguish the tube when the antenna is pointing in the direction of the undesired sector. To accomplish this, switch 393 is opened, and the sector scanning arrangement put into operation. When switch 393 is opened, the circuit of the intensity grid 380 is: conductor 392, brush 391, ring 390, conductor 389, segment 388, brush 387, ring 386, brush 385, conductor 384 and bleeder resistor 376. Since conducting segment 388 revolves at the same speed and is oriented in the same direction as antenna 308, it follows that the intensity grid 380 will receive the necessary positive potential as long as brush 387 remains on the conductive segment 388. When this contact is broken by an insulating segment 1210, cathode-ray tube 324 becomes extinguished, and remains extinguished until brush 387 makes an electrical contact once more with the conducting segment 388. One of the advantages of this system resides in the fact that sector scanning becomes possible without resorting to a sudden reversal of rotation of antenna 308 at both ends of the sector, thus avoiding the imposition of high mechanical stresses on the antenna and its mount. When this type of sector scanning is used, No. 1 sweep is reproduced over one sector and No. 2 sweep over the opposite sector of the oscilloscope screen. The retentivity of the oscilloscope screen, the rate of keying, as well as the rotational speed of antenna 308, when this type of operation is used, are such that images of sufficient brilliance are ordinarily retained on the oscilloscope screen although the tube itself is operated only during one-half of the revolution of the antenna.

If, with such sector scanning, it becomes desirable to gradually shift the active sector so that it scans the entire 360° at relatively slow speed, motor 1208 may be started resulting in the rotation of gear 1204, ring 386, and brush 387. The rotation of ring 386 changes the relative speed of brush 387 with respect to the conductive segment 388, and this produces gradual angular rotation of the active, selected sector about the center of the oscilloscope screen. For example, if the initial scanning were restricted to the northern 180° sector, the scanned sector may be gradually rotated, either in a clockwise or counterclockwise direction, depending upon the direction of rotation of ring 386. Thus, first a northern sector, then north-eastern, eastern, south-eastern, southern sectors etc., will be scanned in a continuous sequence, if the rotation of ring 386 is in the clockwise direction.

Figures 10, 13 and 14 disclose an arrangement for lighting a dial, Fig. 13 being a transverse section along line A—A of Fig. 10, and Fig. 14 being a fragmentary longitudinal section of Fig. 10. This dial and its grating may be used with P. P. I. oscilloscopes when no marker circuit is available, or when a map of surveillance is preferred. Although the grating is described here in connection with its adaptation to a P. P. I. oscilloscope, it is apparent that the disclosed structure has a much wider utility, and may be used wherever an illuminated dial with a scale is desired. The dial consists of a curved disc 1020 which matches the curvature of the oscilloscope screen and is superimposed directly over it. With the exception of the angular azimuth scale, one circular groove 1021 representing one of the range scale circles, and a range reference circle 1050 the purpose of which will be described later in this specification, no complete etched scales are illustrated in any of the figures.

The lighting arrangement of this dial plate is illustrated more fully in Figs. 13 and 14. A disc 1020 fits with its outer edge into a groove 1022 in a split ring 1024—1025. Disc 1020 and split ring 1024—1025 are made of a transparent resin, such as acrylic resins which are the solid forms of the polymeric esters of acrylic and methacrylic acid. Polymethyl methacrylate (typical trade names are Lucite and Crystallite) is an especially suitable material. Two metal sockets 1026 and 1028 join the ring at 1032 and 1034, these sockets holding electric bulbs 1030 and 1031. The ring itself is surrounded by a rubber casing 1036 and 1038 so that light entering the ring at 1040 and 1042 is prevented from illuminating anything else but the grating. Springs 1043, 1044 and clamping rings 1045, 1046 are provided on the electric bulb sockets for holding the grating on a frame supporting the cathode-ray oscilloscope tube 324. A light emanating from the bulbs 1030, 1031 enters the rings 1024, 1025 at their split portions 1040, 1042, and is conducted by the rings through the rectangular groove 1022 into disc 1020, thus internally illuminating the disc over its entire surface.

Light confined to disc 1020, upon striking the etched portions 1021 and 1023, which are in this case etched on the inner surface of disc 1020 for avoiding the parallax between the etchings and the oscilloscope screen, illuminates the etchings which appear as brightly illuminated, glowing lines on a faintly illuminated background of the disc. The advantages of such construction reside in the fact that a very high intensity of illumination may be obtained at the etchings only, this intense illumination being of highly localized nature so that it does not interfere with relatively faint fluorescence on the oscilloscope screen. Moreover, the source of light is placed in the plane of the disc which results in a very compact mechanical structure. When such discs are used as dials, such as radio dials, the etched wavelength-frequency scales should be placed on the outer surface of disc 1020, i. e. the surface facing the reader of the dial. To accomplish a uniform distribution of light over the entire area of disc 1020, the surfaces of grooves 1022 and of the peripheral edge of disc 1020 have a finish of progressively increasing degree of roughness, the rough finish increasing as these surfaces recede from the sources of light. The light-entering surfaces 1040 and 1042 have a polished finish.

It is obvious that the P. P. I. system illustrated in Figs. 3, 4, 6 and 7 will function quite well without any grating since the marker circuit provides sufficient range scale for identifying the range of the objects. The angular azimuth scale, however, cannot be dispensed with, and must be used irrespective of the presence or absence of the central range scale grating.

The functioning of the P. P. I. system should be apparent from the description thus far given, and only a brief summary of its operating cycle is necessary for its completion. Upon starting of the entire system illustrated in Figs. 1, 2 and 3, driving motor 316 is disconnected from an A. C. source at that instant when the lobe axis of the antenna array 308 points directly north. Upon proper orientation of the antenna, the indexing wheel 330 is used for positioning the yoke coils 322 so that the line 1014, 1012, Fig. 10 formed by the two sweeps also points in the northerly direction with point 1012 coinciding with the 0°–180° line on the azimuth scale of the oscilloscope screen. Since, when this adjustment is being made, driving motor 316 is disconnected, yoke coils 322 are at a standstill, and therefore, the angular position of the sweep is under complete control of the operator through the indexing wheel 330. With the driving motor 316 still in a disconnected position, a standard frequency pulse signal from an outside source is impressed on conductor 311, video amplifier and mixer 312, and cathode 372 of the cathode-ray tube 324. The pulse frequency is chosen to produce the desired standard marker spacings on the oscilloscope screen, which are then used for adjusting the marker signals 1004 generated by the range marker channel 404, Fig. 4. If the range marker channel frequency is properly adjusted, the bright spots 1004 produced on the oscilloscope screen by the range marker channel and the standard frequency pulses will be uniformly spaced with respect to each other over the entire sweep. If the range marker channel generates a frequency which differs from the frequency generated by the standard frequency generator, the bright spots appearing on the oscilloscope screen will have nonuniform spacings, and this may be used for adjusting the frequency of the range marker channel by adjusting resistance 630, Fig. 6 connected in the cathode circuit of the multivibrator T—33—T—34 until uniform spacing of bright dots is obtained. To make the adjustment of the standard range marker channel 404 more convenient, a phase shifter may be interposed between standard frequency source and conductor 311 so that complete coincidence between the bright dots produced by these two sources of signals is obtained when the frequency of the range marker channel is equal to the standard frequency.

After the range marker channel has been adjusted, the durations of the duty cycle waves 5—16, 5—12, and the amplitudes of the saw-tooth waves 5—17a and 5—13a generated by the No. 1 and No. 2 sweep channels are adjusted by adjusting potentiometer resistors 727, 728, 740 and 741 appearing in the grid circuits of the multivibrator tubes T—23, T—16 and in the output circuits of the saw-tooth oscillator tubes T—17 and T—24. Since the frequency of the range marker channel 404 has now been adjusted, the range reproduced on the oscilloscope screen can be very readily obtained by counting the number of bright spots 1004 appearing on the respective sweeps, and if the full range is, for example, a 150 mile range, and the frequency of the range marker generator is so adjusted so as to produce 10 mile markers on the oscilloscope screen, potentiometer 727 of the multivibrator tube T—23 and potentiometer 741 of the saw-tooth oscillator tube T—24 are adjusted until the saw-tooth wave and radius 1002—1012, Fig. 10, ends at the 15th dot, and this dot appears in the proper place on the outer periphery of the screen. The same procedure is followed in connection with the No. 2 sweep channel. It is obvious that the saw-tooth oscillator and its associated circuits will need additional preliminary adjustments for checking the linearity of the saw-tooth wave generated by these channels. These adjustments, however, are very well known to those skilled in the art, and for that reason need not burden this disclosure. With the markers and sweep channels adjusted, the output of receiver 310 is impressed on the oscilloscope tube and, with only the interference signals impressed by the receiver, the potentials impressed on the intensity grids 380, 356 and cathode 372 are adjusted to cut-off potential of the cathode-ray beam. Upon the completion of this last adjustment, driving motor 316 is connected to the A. C. source of potential, and the entire system is made to scan the desired field. If a 360° scanning is desired with both sweeps appearing on the oscilloscope screen, the three-position switch 782 is placed on its terminal No. 1 so that both sweep channels remain active and switch 393 is closed so that sector scanning distributor is shunted. At any desired instance one of the channels may be rendered inactive by operating switch 782 to its position No. 2 or No. 3 so that either the main range or the auxiliary vernier range only appear on the oscilloscope screen. If only sector scanning is desired, switch 393, Figs. 3 and 12, is opened, thus transferring control over the potential impressed on the intensity grid 380 of the cathode-ray tube 324 to sector 388 and ring 386. If gradual changing of the scanned sector is desired for obtaining 360° azimuth scanning, motor 1208 is started, which results in the rotation of the conducting ring 386 and rotation of brush 387. When this is the case the scanned sector itself is slowly rotated at a speed corresponding to the speed of rotation of brush 387. This speed should be lower than the rotational speed of the antenna. The functioning of the oscilloscope circuit itself is as follows: if the oscilloscope is connected to a synchronous radio locator such as the one illustrated in Fig. 1, synchronizing oscillator 10 is used for controlling the timing of all transmitter and receiver channels, the oscilloscope circuit being a component of the receiver channel. For accurate azimuth determinations the sweep must always point in the same direction as the axis of the antenna array beam. This requirement is satisfied, as it has been explained in connection with Fig. 3, by pointing antenna array directly north, or in any other known direction, and by adjusting the angular position of the cathode-ray beam on the oscilloscope screen by means of the indexing wheel 330 so that it points in the same direction. Since from then on the antenna array and the yoke coils 322 become definitely interlocked through the "Selsyns" this interlocked relationship will maintain itself throughout the normal operating cycle of the system. For accurate range determinations the full range sweep must start from its zero point at the instance of transmitting the exploratory pulse. This point is ordinarily located at approximately the geometric center of the oscilloscope screen. To accomplish this result the sinusoidal wave 5—1 of the synchronizing oscillator 10 is transformed into a series of narrow, negative rectangular pulses 5—5, Fig. 5, by the synchronizing pulse shaping channel 406, one rectangular pulse being generated per each cycle of the sinusoidal wave. These rectangular pulses are then transformed into the rectangular waves 5—6 by means of the multivibrator circuit T—6—T—7, Fig. 6 which is used for generating the rectangular pulse 5—9 in one sweep channel, and a similar rectangular pulse 5—15 in the other channel, these pulses being separated from each other by a time element equal to one period of the sinusoidal wave 5—1. This relationship is clearly indicated in Fig. 5. Accordingly, it may be stated that all circuits which are interposed between the oscillator T—1 and the multivibrator circuits T—22—T—23 in No. 1 sweep channel and T—13—T—14 in the No. 2 sweep channel are for the sole purpose of generating a single rectangular pulse in one sweep channel during one cycle of the sinusoidal wave, and then an identical rectangular pulse in the other sweep channel during the next cycle of the sinusoidal wave. The timing of these rectangular pulses 5—9 and 5—15 depends upon the timing of the sinusoidal wave, and, therefore, these pulses will always follow any change in frequency or timing of the sinusoidal wave. In No. 1 sweep channel the rectangular pulse 5—15 is used for timing the generation of the saw-tooth wave 5—17 by controlling the delayed multivibrator T—22, T—23, the output of which in turn controls the operating cycle of the saw-tooth oscillator T—24. In this sweep channel the timing of the saw-tooth wave 5—17 remains fixed with respect to the transmitted signal so that both appear simultaneously at the cathode-ray tube 324, which satisfies the second requirement, and namely, that the sweep must always start at the time of transmitting an exploratory pulse. In No. 2 sweep channel, circuits must be provided for changing the time of appearance of the saw-tooth wave in the oscilloscope coils 322, and for accomplishing this result a precision delayed multivibrator circuit T—13—T—14 is provided which enables one to delay the generation of the saw-tooth wave any desired time after the transmittal of the exploratory pulse by merely adjusting the potential impressed on the control grid of the precision delayed multivibrator. The remaining elements of the No. 2 sweep channel are identical to the same elements in No. 1 sweep channel; they consist of a delayed multivibrator circuit T—15—T—16, a saw-tooth oscillator T—17, and a power amplifier T—18 with the clamper circuit T—19—T—20. The precision delayed multivibrator is so adjusted that any desired portion of the full range reproduced on No. 1 sweep may be reproduced on the No. 2 sweep. Its potentiometer is calibrated in proper linear units, such as yards, miles, or kilometers so that the entire range of the desired echo may be determined by reading the setting of potentiometer 708 and adding to this reading the range reading appearing on the vernier sweep scale. Normally, when this mode of range measuring is used, the precision delayed multivibrator potentiometer is so calibrated that the desired marker is placed midway on the sweep when the potentiometer dial is turned by the operator to the desired distance, and the distance to the desired echo is determined by either adding or substracting the oscilloscope screen range indication from the potentiometer reading. For example, let it be assumed that the full range of the system is 150 miles and there are 10 mile markers available. Suppose the desired echo is located between the 10th and 11th markers on the main sweep, indicating that its distance is more than 100 miles. The operator may select either the 10th or the 11th marker for positioning of this echo on the vernier sweep by turning the potentiometer dial either to "100" or "110." Suppose that the vernier sweep has a 30 mile range. If "100" were placed to the midway position on the vernier sweep, the echo would be reproduced between this midway marker and the outer portion of the sweep. To obtain the range in this case, the operator would read the potentiometer dial, which reads "100" and add the estimated distance perceived from noting the position of the echo between the 10th and the 11th markers. If it is midway between them, the total range would be 105 miles. If the operator had chosen the 11th marker in the previous case, the echo would appear between the 11th marker and the inner portion of the sweep, and it would be necessary for him in this case to subtract 5 miles from the "110" reading on the potentiometer scale.

This type of range determination has its limitations since it involves reading of the potentiometer scale, estimating the additional range of the echo on the vernier sweep, and mentally adding the two by the operator. Moreover, in order to obtain accurate range determinations with this mode of operation, it becomes very important that a proper range marker is positioned in the center of the screen before the vernier range reading is taken by the operator. Thus, this mode of range determination involves four separate steps, and the step involving adding of the two readings, is an especially vulnerable one which is apt to result in the erroneous range determinations, delay accurate range readings, and tax the operator's abilities to an undue extent. To avoid this difficulty, a more reliable range determination method consists of the following procedure. The oscilloscope grating is provided with a range reference circle 1050, which is preferably positioned midway between the center point 1002, Fig. 10, and the outer periphery of the oscilloscope tube defined by the azimuth scale in Fig. 10. This range reference circle is used as a reference line for centering the desired echo signal under this line for range determination by varying the setting of potentiometer 708. This type of operation and echo centering is comparable with that class of the radio object-locating systems which use Class A sweeps on the oscilloscope tubes where the range is determined by positioning the desired echo signal under the hair line bisecting the oscilloscope screen, or by positioning it in a reference notch which sometimes replaces the hair line. This type of range determination is disclosed, for example, in an application for patent by William A. Huber and William T. Pope, Serial No. 506,808, filed on October 19, 1943, and entitled "Radio Object-Locating System." The grid potentiometer 708 is then calibrated so that its scale gives at once the entire range reading when the desired echo signal is properly aligned with the range reference circle 1050.

The calibrating procedure in this case is the same as in the previously described case, i. e. the potentiometers 728 and 740 are used for adjusting the duration and the length of the sweep, and after obtaining the desired range, potentiometer 708 is calibrated by positioning the successive markers under the range reference line. It should be noted here that if the vernier range is, for example, a 30 mile range, no direct range reading on the vernier range can be obtained for the objects which are located between 0 and 15 miles, since it is impossible to advance this portion of the range to the range reference circle. It may be recalled from the previous description that the precision delay multivibrator T—13—T—14 is used for retarding the generation of the sweep, but it cannot advance the generation of the sweep ahead of the transmitted exploratory pulse since it is controlled by this pulse. In the above illustrations the sweep wave is started by the transmitted pulse itself so that the operation of the two sweep channels is identical, both channels beginning their sweeps simultaneously with the appearance of the transmitted pulse at the cathode of the oscilloscope tube. Therefore, when this limit is reached, no further shift in the vernier sweep is any longer available, and the range reading may be obtained only on the vernier sweep itself by observing the position of the echoes of the oscilloscope screen.

The advantages of this type of range determination are quite apparent. It involves only one very simple step, namely, centering of the desired echo image on the oscilloscope tube so that it appears directly under the range reference circle, and reading the potentiometer setting which at once gives the correct range of the object producing the selected echo signal. By positioning the range reference circle 1050 midway between the center and the periphery of the oscilloscope screen, accurate range determinations become possible since at this portion of the screen the echo images ordinarily appear very well dispersed because of the larger area available on the screen for their reproduction. Moreover, the "utility target" type of operation which involves obliteration of the remaining range field is avoided since all targets on either side of the selected echo signal are fully reproduced on the same oscilloscope screen, thus retaining the panoramic view always desirable in connection with the P. P. I. systems.

The specification has disclosed two possible range scales which may be used with the bi-radial sweep. One scale consists of a Lucite grating which is superimposed over the oscilloscope screen, while the other scale consists of producing linear distance scale on the oscilloscope screen by generating properly timed pulses which modulate the intensity of the cathode-ray beam at regular intervals.

Switching arrangements have been also disclosed for reproducing two sweeps, or either one of the two, on the oscilloscope screen. These switching arrangements include rotary commutator type switches for obtaining sector scanning, and also that type of sector scanning in which the scanned sector itself is rotated around the zero range point on the oscilloscope screen at a speed which is lower than the rotational speed of the antenna array. The disclosed switching arrangements also enable one to sector scan with the bi-radial sweep or either of the two sweeps.

No switching arrangements have been disclosed for selecting any desired range from a plurality of ranges available since the arrangements of this type are known in the art. They ordinarily consist of multicontact drum switches which disconnect the resistance-condenser combinations used for one range in the saw-tooth oscillator circuits, and substitute resistance condenser combinations of either greater or smaller values in their stead, depending upon the desired range. It is obvious that such switching arrangements may be incorporated in the bi-radial sweep oscilloscope circuit disclosed in this specification. It should be noted, however, that if such switching arrangements were to be inserted in the circuits disclosed in the Figs. 6 and 7, it should include the variable parameters of the multivibrator circuits T—22—T—23 in one channel, and T—15—T—16 in the other channel, so that these multivibrator circuits would generate the rectangular waves of the duration equal to the duration of the saw-tooth waves generated by the saw-tooth oscillators T—24 and T—17.

The advantages of the disclosed system should be apparent to those skilled in the art from the given disclosure. P. P. I. systems possessing much greater precision and operating versatility become possible. The full range as well as the vernier range appear on the same screen of a single P. P. I. oscilloscope tube, thus enabling one operator to observe very conveniently the entire full range field and any desired portion of the full range field on an expanded and more precise range scale. Moreover, circuits for obtaining direct range reading on a dial have been disclosed which eliminate to a very large extent the errors ordinarily committed by the operators.

The term "transmitter" as used in the claims refers to the entire transmitting channel including all of its components such as buffer phaser 332, synchronizing oscillator 300, keyer 302, transmitter 304, and antenna 308 (Fig. 3).

It is believed that the construction and operation of our new P. P. I. radio locator and of the bi-radial oscilloscope as well as the many advantages thereof will be apparent from the foregoing description. It will, therefore, be apparent that while we have shown and described our invention in one preferred form, many changes and modifications may be made without departing from the spirit of our invention as sought to be defined in the following claims.

We claim:

1. In the method of determining the locations of objects by means of a pulse-echo radio system provided with a single display screen for indicating said locations, those steps which include generating a full range sweep, superimposing said full range sweep along one portion of said screen, successively displaying the instantaneous locations of all detected objects along said full range sweep, generating an expanded range sweep, independent of said full range sweep, superimposing said expanded range sweep along an angularly different portion of said screen, and successively displaying along said expanded sweep the instantaneous locations of the objects whose ranges are within the range limits of said expanded range sweep, whereby the images of the objects within the range limits of said expanded sweep appear simultaneously on said screen along the respective sweeps.

2. In the method of determining the locations of objects detected by pulse-echo radio locator connected to a plan position indicator, those steps which include generating a full range radius vector, successively displaying the instantaneous locations of all detected objects along said vector, generating an expanded range radius vector in a direction substantially diametrically opposite to the direction of said full-range vector, and successively displaying along said expanded range vector the instantaneous locations of the objects whose ranges are within the limits of said last vector.

3. In a method of determining the locations of objects by means of a radio pulse-echo object-locating system connected to a plan position indicator capable of reproducing said locations along a polar coordinate system, the steps which include generating a full range radius vector, successively pointing said vector in the direction of the objects by rotating said vector, reproducing along said vector the azimuth and range of said objects, generating a vernier range vector in a direction substantially diametrically opposite to the direction of said full range vector and of a length equal to the length of said full range vector, rotating said vernier vector at an angular velocity equal to and in the same direction as the angular velocity of said full range vector, and reproducing along said vernier vector the azimuth and range of the objects whose ranges are within the limits of said vernier vector.

4. In a radio plan position indicator, the method of indicating the location of echo producing objects along polar coordinates which includes the steps of generating a full range sweep, rotating said sweep around the center of said coordinates, reproducing the azimuth and range of said objects along said full range sweep, generating an auxiliary range sweep in opposite direction to said full range sweep, rotating said auxiliary sweep around said center at the same angular velocity and in the same direction of rotation as the angular velocity and the direction of rotation of said full range sweep, and reproducing along said auxiliary sweep the azimuth and range of the objects within said auxiliary range sweep.

5. The method of indicating the location of echo-producing objects as defined in claim 4 which includes the additional step of varying the time of occurrence of said auxiliary sweep for selecting any desired portion of the full range for its reproduction on said auxiliary range sweep.

6. In a radio plan position indicator, the method of plan position indicating the location of echo-producing objects which includes the steps of generating a full range sweep, reproducing the echoes from said objects in their proper azimuth and range relationship on said full range sweep, generating an auxiliary range sweep pointing substantially in a diametrically opposite direction to the direction of said full range sweep, and reproducing on said auxiliary range sweep only the echoes coinciding in time with said auxiliary range sweep.

7. The method of measuring distance by means of a radar system, which includes the steps of radiating periodically exploratory pulses toward reflecting objects, receiving echoes of said pulses from said objects, generating full and vernier range sweeps, reproducing said sweeps as a diameter of a circle, said sweeps constituting two radii of said diameter, and reproducing one set of echoes received in response to one pulse along one radius and a set of echoes received in response to another pulse along the other radius.

8. In the methods of determining range and azimuth of objects by means of a radio object-locating system connected to a plan position indicator, said indicator being capable of reproducing the locations of said objects along a polar coordinate system, the steps which include transmitting a first directional exploratory pulse, receiving a first series of echoes from said objects in response to said first pulse, generating full and vernier range sweeps, reproducing said sweeps as a diameter of a circle, said sweeps constituting two radii of said diameter, pointing the full range radius in the direction of transmission of said first pulse, reproducing said echoes along said full range radius for visually indicating respective ranges and azimuth of said objects, transmitting a second directional exploratory pulse, receiving a second series of echoes from said objects in response to said second pulse, pointing said vernier range radius in a substantially diametrically opposite direction to the direction of transmission of said second pulse, and reproducing along said vernier radius the echoes of the objects whose ranges are within the limits of said vernier radius.

9. In a synchronous radio object-locating system the method of determining range and azimuth of objects, by means of a plan position indicator which includes the steps of generating a sinusoidal wave, controlling a periodic transmission of exploratory pulses by means of said wave, receiving echoes of said exploratory pulses, controlling the timing and generation of two saw-tooth waves by means of said sinusoidal wave, producing two polar coordinate systems having a common center by means of said two saw-tooth waves, and producing a first and a second set of visual indications of said echoes along said polar coordinate systems.

10. In the method of determining the locations of objects by means of pulse-echo object-locating system connected to a plan position indicator capable of reproducing said locations along polar coordinates system, said plan position indicator including a cathode-ray tube having a screen and a fixed scale superimposed over said screen, said scale having a reference circle, the steps which include transmitting a directional exploratory pulse, receiving echoes of said pulse from said objects, generating a sweep whose duration is adjusted for reproducing only a portion of the full range of said system, successively displaying along said sweep the instantaneous locations of objects whose ranges are within the time limits of said sweep, positioning a selected echo under said reference circle by varying the time of occurrence of said sweep, and automatically translating said time into terms of distance for measuring the range of the object producing the selected echo.

11. A radio object-locating system comprising a rotating directional antenna array, a transmitter connected to said array, said transmitter periodically radiating directional exploratory pulses by means of said array, a receiver connected to said antenna array, a plan position indicator connected to said receiver and to said transmitter, said plan position indicator including a cathode-ray tube, a rotating yoke for electromagnetically deflecting the cathode-ray beam in said tube, electromechanical connections between said rotating yoke and said antenna array for rotating said yoke synchronously with said antenna, two sweep generating channels connected between said transmitter and said rotating yoke, one of said sweep channels, when triggered, impressing a first saw-tooth wave of one polarity, and the other sweep channel, when triggered, impressing on said yoke a second sawtooth wave of opposite polarity, and means for triggering one of said sweep channels in synchronism with alternate pulses radiated by said array, and triggering the other of said sweep channels in synchronism with the remaining pulses radiated by said array.

12. A radio object-locating system as defined in claim 11 which further includes a synchronizing oscillator connected between said transmitter and said two sweep generating channels, said synchronizing oscillator controlling the generation of said positive and negative current sawtooth waves.

13. A radio object-locating system as defined in claim 11 which further includes electrical networks between said transmitter and said two sweep generating channels for controlling the generation of said saw-tooth waves by means of said exploratory pulses.

14. A radio object-locating system as defined in claim 11 which further includes a keyer connected to said transmitter for periodically keying said transmitter, and electrical networks between said keyer and said two sweep generating channels for controlling the generation of said sawtooth waves by means of the keying pulses generated by said keyer.

15. A radio object-locating system as defined in claim 11 which further includes instrumentalities for adjusting said electro-mechanical connections between said rotating yoke and said antenna array, and keying means connected to said transmitter and said two sweep generating channels, said instrumentalities and said keying means being synchronized to make one radial sweep, produced by one saw-tooth wave on the screen of said cathode-ray tube, point in the same direction as said directional exploratory pulses, and another radial sweep, produced by the other saw-tooth wave, point in a substantially diametrically opposite direction to the direction of said exploratory pulse.

16. A radio object-locating system as defined in claim 11 which further includes a synchronizing oscillator connected to said transmitter and a phaser connected between said oscillator and said sweep generating channels for cophasing said sweep channels with said transmitter and for making the starting instance of at least one of said saw-tooth waves and of every other a preselected exploratory pulse appear simultaneously at the control elements of said cathode-ray tube.

17. A radio object-locating system as defined in claim 11 which further includes first and second means within each of said channels, said first means generating a first rectangular wave, the duration of which is equal to the sweep portion of said first current saw-tooth wave, and said second means generating a second rectangular wave, the duration of which is equal to the duration of the sweep portion of said second saw-tooth wave, and connections between said first and second means and said cathode-ray tube for impressing said rectangular waves on one of the control electrodes of said tube for making said tube responsive only for the duration of said first and second rectangular waves.

18. A radio object-locating system as defined in claim 11 which further includes a range marker connected between said transmitter and said cathode-ray tube, said range marker including a short duty cycle multivibrator, and connections between said multivibrator and said transmitter for synchronizing the duty cycle of said multivibrator with the duty cycle of said transmitter.

19. A radio object-locating system as defined in claim 11 which further includes a mixer stage connected between said cathode-ray tube and said receiver, a range marker connected between said transmitter and said mixer stage, said mixer intensity modulating said cathode-ray tube for producing range marker indications and echo indications on the screen of said cathode ray tube.

20. A radio locator, for determining range and azimuth of objects producing echoes in response to exploratory pulses, comprising a directional antenna, a transmitter connected to said antenna for transmitting directional exploratory pulses, a receiver connected to said antenna for receiving echoes of said exploratory pulses, first and second sweep generating channels, each generating a series of saw-tooth waves in a predetermined time relationship with respect to said exploratory pulses, a cathode-ray tube, rotable electromagnetic deflection coils surrounding a portion of said cathode-ray tube, instrumentalities for synchronously rotating said antenna array and said coils, connections between said first and second sweep channels and said coils whereby said sweep channels alternately impress upon said coils said respective saw-tooth waves in phase opposition relative to each other for producing a rotating bi-radial sweep on the screen of said oscilloscope tube, and connections between said receiver and said cathode-ray tube for intensity modulating the cathode-ray in said tube for reproducing said echoes first along one sweep and then along the other sweep.

21. A radio locator for determining range and azimuth of objects producing echoes in response to exploratory pulses of electromagnetic energy, comprising a directional antenna, a transmitter connected to said antenna for transmitting exploratory pulses, a receiver connected to said antenna for receiving a series of echoes of said exploratory pulses, a first full range sweep channel generating a saw-tooth wave the duration of which corresponds to the full range of said locator, a second vernier range sweep channel generating a saw-tooth wave the duration of which corresponds to a fraction of the full range of said locator, a cathode-ray tube, rotatable deflection yoke surrounding said cathode-ray tube, instrumentalities for synchronously rotating said antenna array and said yoke, and connections between said first and second channels and said yoke whereby said channels impress upon said yoke said saw-tooth waves in alternate succession producing a rotating bi-radial sweep on the screen of said tube, said full-range sweep making a trace pointing in the same direction as the lobe axis of said antenna array, and said vernier sweep making a trace pointing substantially in a diametrically opposite direction to the direction of said full range sweep.

22. A radio locator as defined in claim 21 which further includes connections between said receiver and said cathode-ray tube for intensity modulating the cathode-ray beam in said tube for reproducing along said full range sweep all echoes in their true azimuth and range relationship and along said vernier sweep only the echoes of the objects whose ranges are within the limits of said vernier sweep.

23. A radio locator as defined in claim 21 which further includes a range reference circle mounted on the screen of said cathode-ray tube, a delay circuit in said second channel for varying the time of occurrence of the saw-tooth waves generated by said second channel whereby a selected echo may be positioned under said reference circle, and a range dial connected to said delay circuit for automatically transforming said time into the range of the object producing said selected echo.

24. A radio locator as defined in claim 21 in which said instrumentalities for rotating said antenna and said coils further include mechanical instrumentalities for adjusting the angular position of said rotatable deflection coils and for pointing either of said sweeps in the same direction as the lobe axis of said antenna array.

25. A radio locator for determining the location of objects producing echoes in response to exploratory pulses, said location comprising a receiver, a cathode-ray tube having a screen, an intensity grid and a rotated beam-deflecting means, said intensity grid being connected to said receiver, said receiver normally impressing upon said grid a series of echoes in response to each exploratory pulse, two sweep generators connected to said beam-deflecting means, one of said generators having means for impressing at a predetermined time interval, a saw-tooth wave of one polarity on said beam-deflecting means, and the other generator having means for impressing, at a subsequent adjustable time interval, a saw-tooth wave of opposite polarity on said beam-deflecting means, whereby said beam-deflecting means produces a radial sweep in one direction and then a radial sweep in a substantially opposite direction, and said grid intensity modulating said beam for reproducing said echoes along said sweeps.

26. A pulse-echo object-locating system for determining the locations of objects in terms of range and azimuth of the said objects; said system including a transmitter radiating a beam of directional exploratory periodic pulses; a receiver for receiving said pulses and echoes of said pulses from said objects; a plan position indicator, including a cathode ray tube having an electron beam and a screen, for reproducing the locations of said objects on said screen along a polar coordinate system; means, including means for rotating said electron beam in synchronism with the rotation of said beam of pulses and a sweep channel generating a sweep voltage having a smaller period than the period of said pulses for radially deflecting said electron beam, for establishing said polar coordinate system, whereby radial deflections of said electron beam have a duration corresponding only to a portion of the full range of said object-locating system; connections between said receiver and said indicator for successively displaying along said radial deflections the instantaneous locations of objects whose ranges are within said portion of the full range of said object-locating system; an azimuth scale on said screen, said scale having a range reference circle whose center coincides with the center of said coordinates; and an electrical instrumentality within said sweep channel for varying the time of occurrence of said radial deflections relative to the time of occurrence of said pulses for positioning a selected echo, from a selected object, in coincidence with said reference circle, said instrumentality including means for translating said time into the range of the selected object.

27. A pulse-echo object-locating system as defined in claim 26 in which said electrical instrumentality comprises a precision delayed multivibrator and a potentiometer connected to the control grid of the first tube of said multivibrator, said potentiometer being calibrated to translate said time into the selected range of the object.

WILLIAM A. HUBER.
MAX GINDOFF.

REFERENCES CITED

The following references are of record in the file of this patent:

UNITED STATES PATENTS

| Number | Name | Date |
|---|---|---|
| 2,093,157 | Nakashima et al. | Sept. 14, 1937 |
| 2,140,972 | Rylsky | Dec. 20, 1938 |
| 2,189,549 | Hershberger | Feb. 6, 1940 |
| 2,215,197 | Sherman | Sept. 17, 1940 |
| 2,241,809 | De Forest | May 13, 1941 |
| 2,300,189 | Wolff | Oct. 27, 1942 |
| 2,313,967 | Read | Mar. 16, 1943 |
| 2,409,462 | Zworykin | Oct. 15, 1946 |
| 2,421,747 | Englehardt | June 10, 1947 |
| 2,422,655 | Hecht | June 24, 1947 |
| 2,426,201 | Grieg | Aug. 26, 1947 |
| 2,430,292 | Hershberger | Nov. 4, 1947 |
| 2,440,250 | Deloraine | Apr. 27, 1948 |
| 2,453,711 | Isbister | Nov. 16, 1948 |

FOREIGN PATENTS

| Number | Country | Date |
|---|---|---|
| 108,556 | Australia | Sept. 14, 1939 |

Certificate of Correction

Patent No. 2,566,332 — September 4, 1951

WILLIAM A. HUBER ET AL.

It is hereby certified that error appears in the printed specification of the above numbered patent requiring correction as follows:

Column 14, line 40, after "negative" insert *voltage*; column 33, line 52, strike out "every other"; line 61, strike out "current";

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*